United States Patent [19]

Lopez-Torres

[11] Patent Number: 6,144,647
[45] Date of Patent: Nov. 7, 2000

[54] COMMUNICATION SYSTEM, MOBILE SERVICES SWITCHING CENTER AND METHOD FOR ESTABLISHING A MULTI-DIALOGUE COMMUNICATION BETWEEN SUBSCRIBER STATIONS

[75] Inventor: Oscar Lopez-Torres, Aachen, Germany

[73] Assignee: Telefonaktiebolaget LM Ericsson, Stockholm, Sweden

[21] Appl. No.: 08/962,671

[22] Filed: Nov. 3, 1997

[30] Foreign Application Priority Data

Nov. 4, 1996 [DE] Germany ............................ 196 45 433

[51] Int. Cl.[7] ............................... H04Q 7/00; H04Q 7/28
[52] U.S. Cl. ......................... 370/329; 370/341; 370/344; 370/437; 370/468; 370/493; 455/560; 379/401
[58] Field of Search .................................... 370/343, 328, 370/329, 480, 482, 493, 535–538, 542, 522, 341, 344, 496, 497, 437, 468; 455/433, 435, 445, 560; 379/229, 401

[56] References Cited

U.S. PATENT DOCUMENTS

| | | | |
|---|---|---|---|
| 5,673,267 | 9/1997 | Adnet ...................................... | 370/480 |
| 5,867,485 | 2/1999 | Chambers et al. ....................... | 370/281 |
| 5,940,759 | 8/1999 | Lopez-Torres et al. ................. | 455/433 |
| 5,999,825 | 12/1999 | Geulen .................................... | 455/560 |

FOREIGN PATENT DOCUMENTS

96/27975  9/1996  WIPO .

OTHER PUBLICATIONS

"European Digital Cellular Telecommunications System (Phase 2); Principles of Telecommunication Services Supported by a GSM Public Land Mobile Network (PLMN) (GSM 02.01)", European Telecommunication Standard, May 1994, cover page and pp. 18–19.

"European Digital Cellular Telecommunications System (Phase 2); GSM Public Land Mobile Network (PLMN) Connection Types (GSM 03.10)", European Telecommunication Standard, May 1994, cover page and p. 16.

"European Digital Cellular Telecommunications System (Phase 2); General on Terminal Adaption Functions (TAF) for Mobile Stations (MS) (GSM 07.01)", European Telecommunication Standard, Dec. 1995, cover page and pp. 21–24.

"Formats and Codes of the ISDN User Part of Signalling System No. ", Specification of Signalling System No. 7, ITU–T Recommendation Q.763, Mar. 1993, cover page, pp. 9–10, and pp. 56–58.

"Digital Subscriber Signalling System No. 1 (DSS 1)—ISDN User–Network Interface Layer 3 Specification for Basic Call Control", Digital Subscriber Signalling System No. 1 Network Layer, ITU–T Recommendation Q.931, Mar. 1993, cover page and pp. 65–68.

Fenton, C.J. et al., "Mobile Data Services", BT Technology Journal, vol. 14, No. 3, Jul. 1, 1996, pp. 92–108.

Ira, Antonio et al., "'Call–Level' and 'Burst–Level' Priorities for an Effective Management of Multimedia Services in UMTS".

*Primary Examiner*—Douglas W. Olms
*Assistant Examiner*—Seema S. Rao
*Attorney, Agent, or Firm*—Burns, Doane, Swecker & Mathis, L.L.P.

[57] ABSTRACT

A communication system, a mobile services switching center and a method is described, for allowing a multi-dialogue communication to take place between a first subscriber station (MS1, MS2, . . . MSn) and a second subscriber station (ISDN ST1) through a mobile services switching center (MSC/VLR) of a public land mobile network (PLMN). A mapping device (MP) of the mobile services switching center (MSC) maps several communication channels between the first subscriber station (MS1, MS2, . . . MSn) and the mobile services switching center (MSC/VLR) onto at least one second communication channel (CC2) between the PLMN and a fixed network (FN).

42 Claims, 12 Drawing Sheets

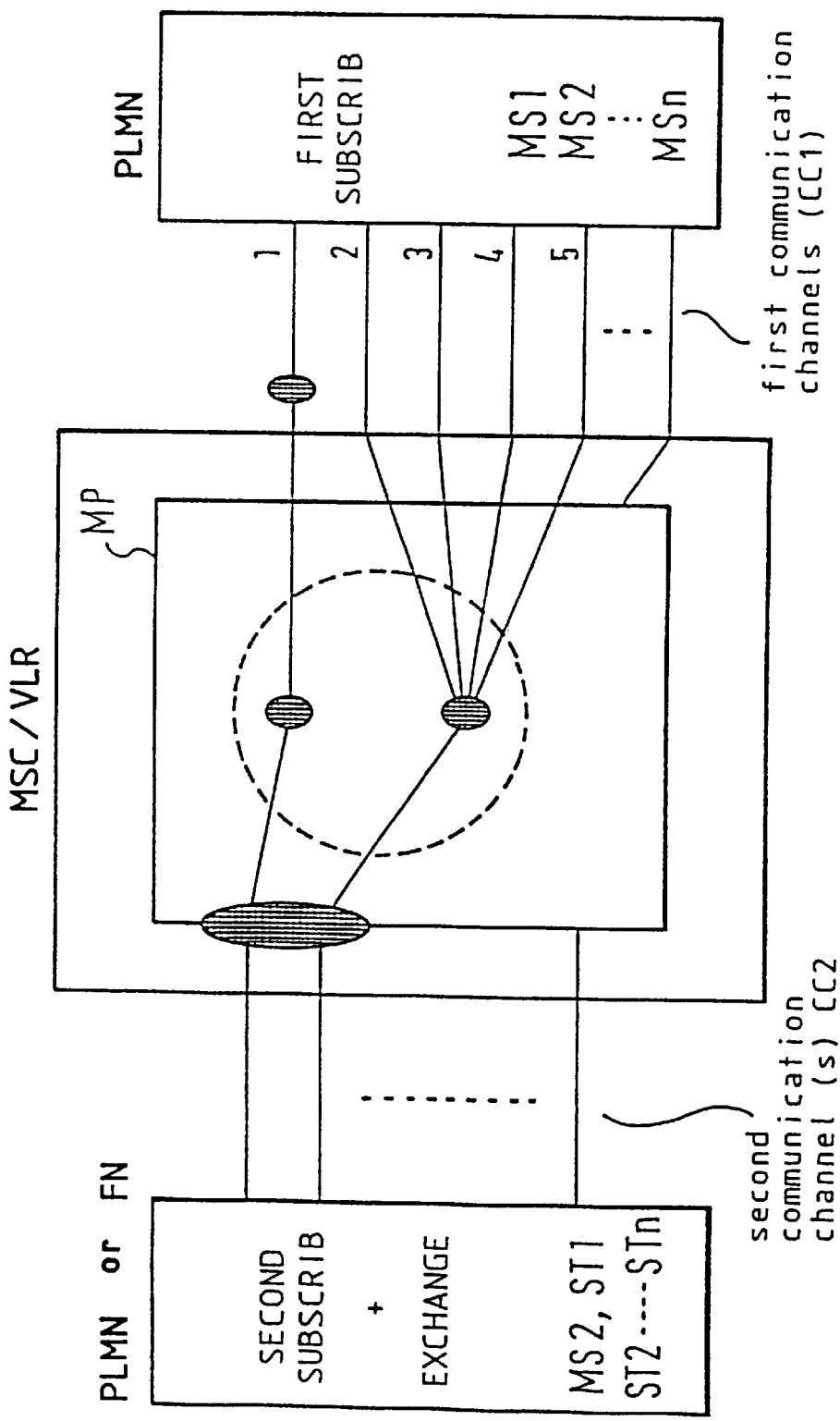
Fig.1  Invention: MSC containing a Multi-Dialogue-Mapper

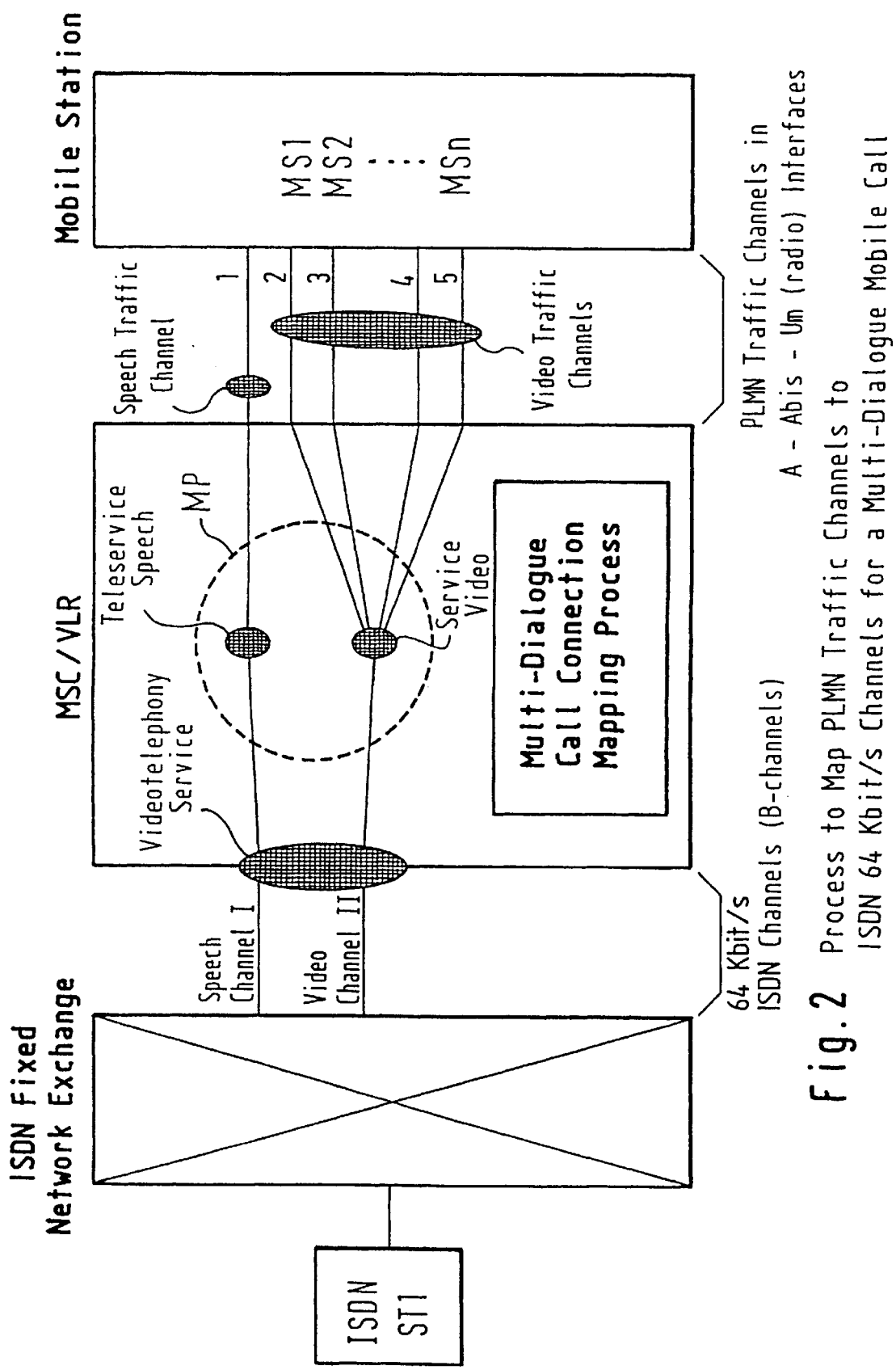
Fig. 2  Process to Map PLMN Traffic Channels to ISDN 64 Kbit/s Channels for a Multi-Dialogue Mobile Call

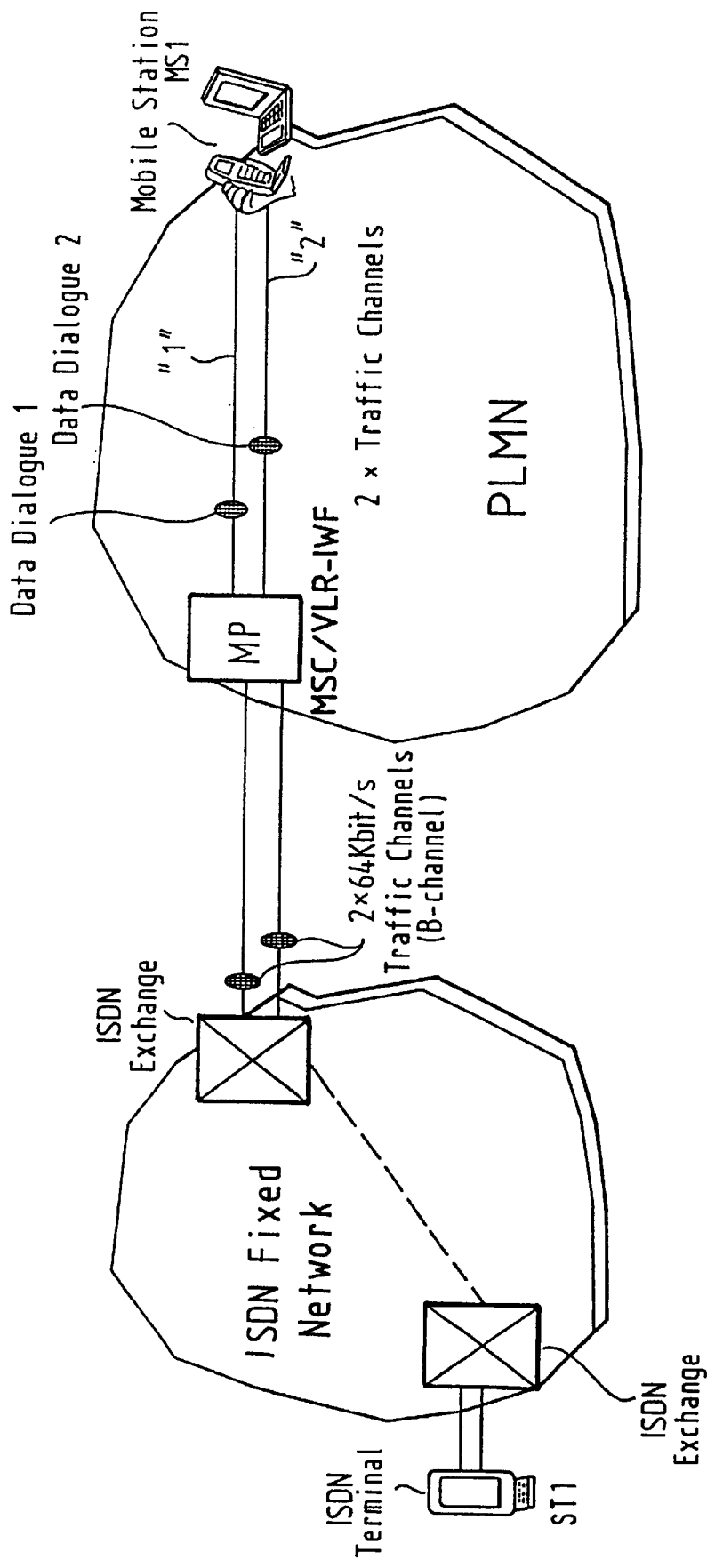
Fig. 3a Multi-Dialogue Call For Two Simultaneous Data Transmissions Between a Mobile Station and an ISDN Terminal

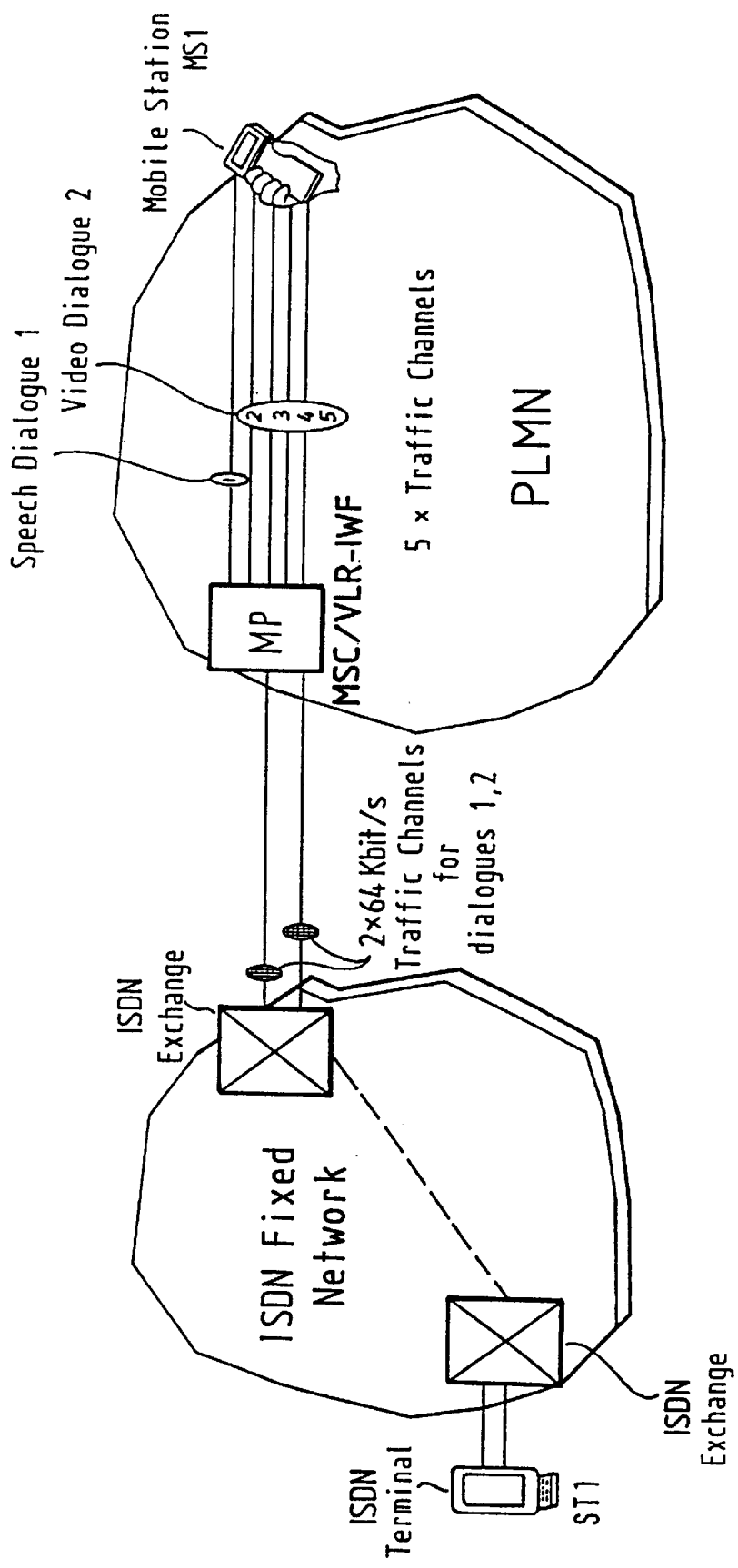
Fig. 3b Multi-Dialogue Call For One Speech and One Video Transmissions-Videotelephony Between a Mobile Station and an ISDN Terminal

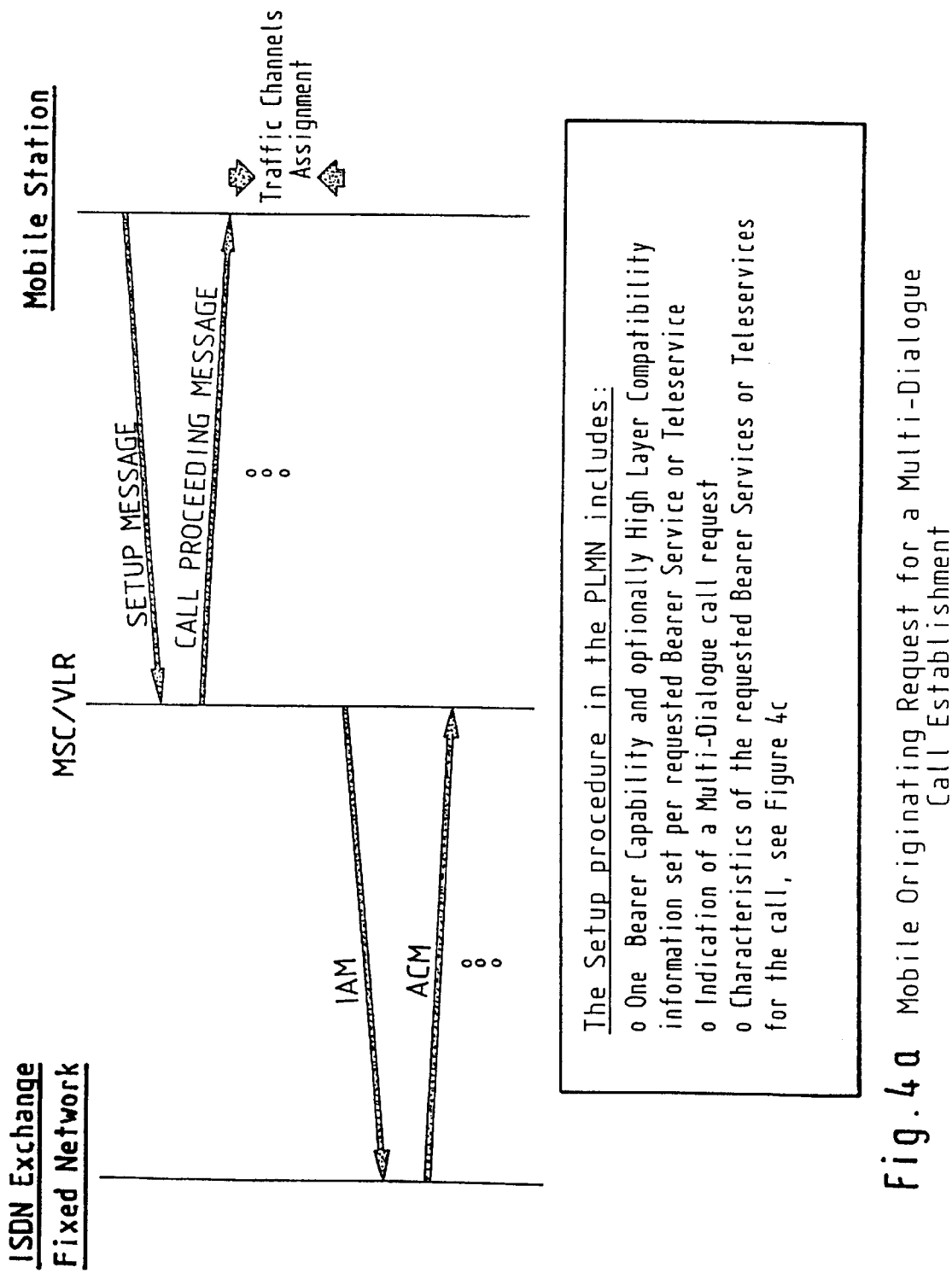
Fig. 4a Mobile Originating Request for a Multi-Dialogue Call Establishment

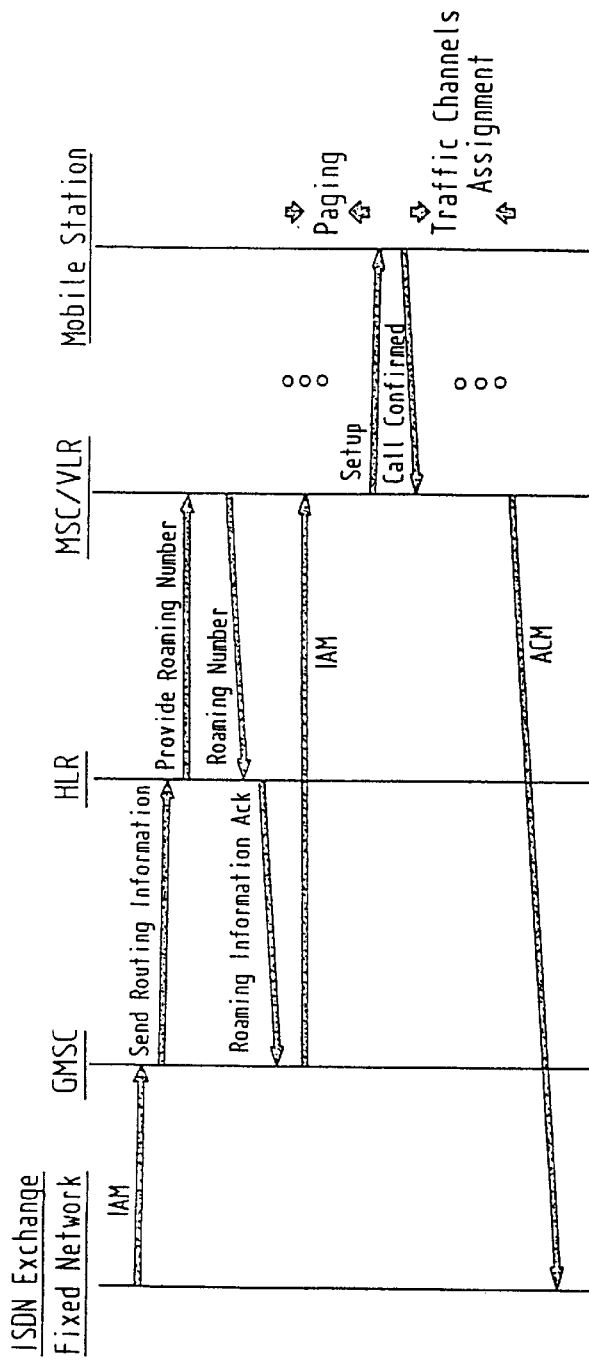
Fig. 4b  Mobile Terminating Offer for a Multi-Dialogue Call Establishment

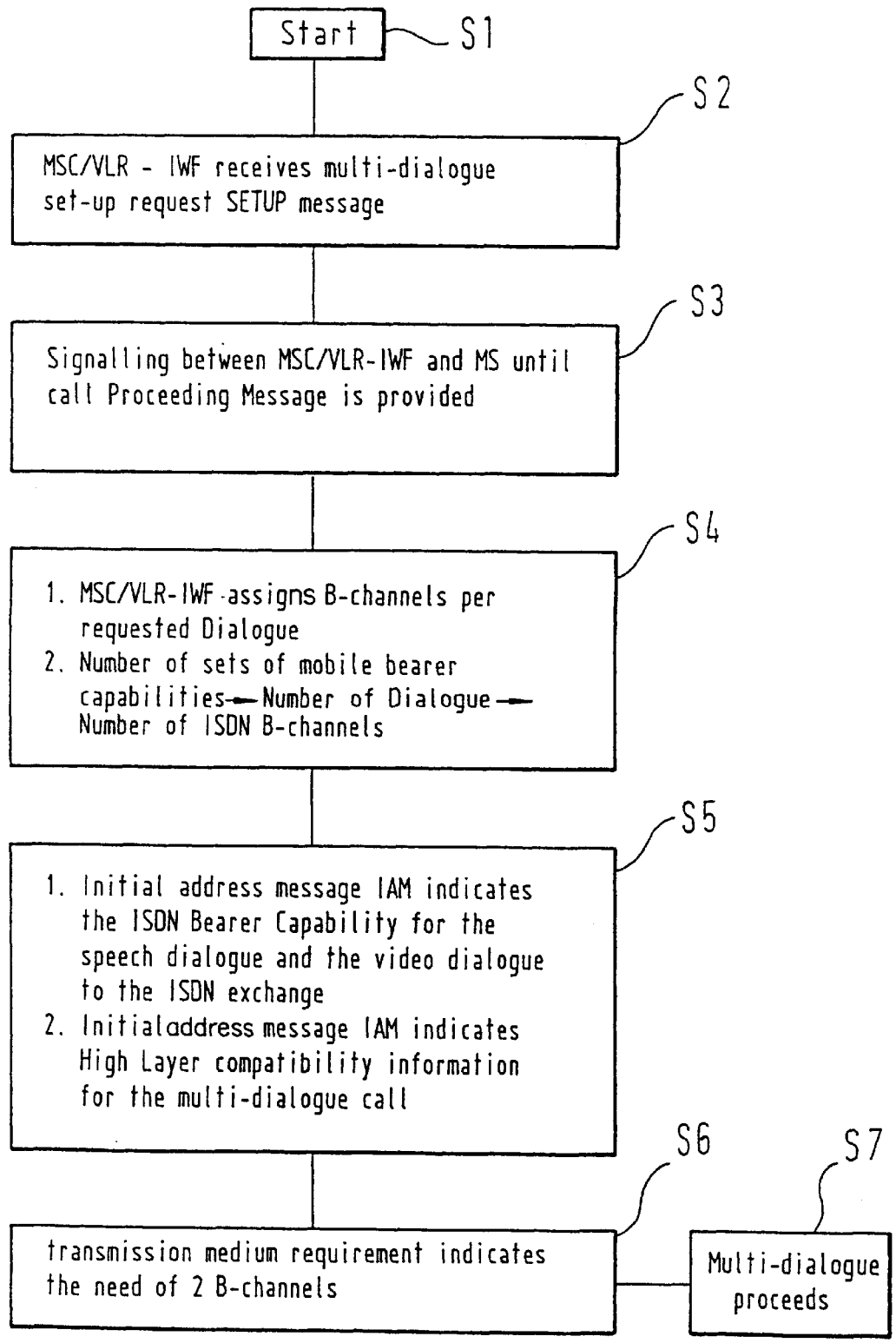
Fig. 4c  Mapping of PLMN traffic channele and ISDN B-channels (Fig. 2, 4a)

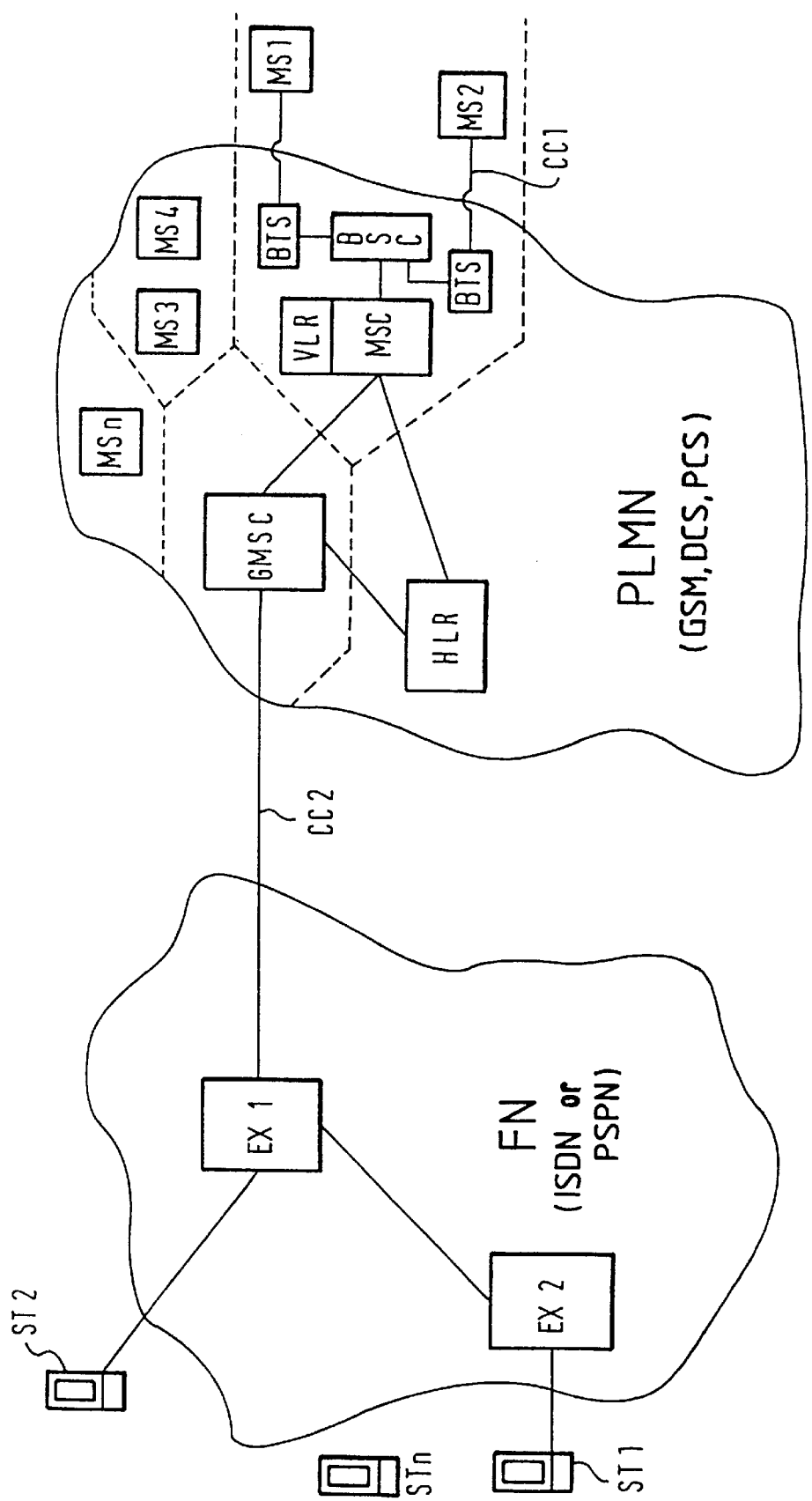
Fig. 5  Prior Art communication system consisting of FN/PLMN

Single dialogue calls between 2 mobile station or one mobile
station and an ISDN station

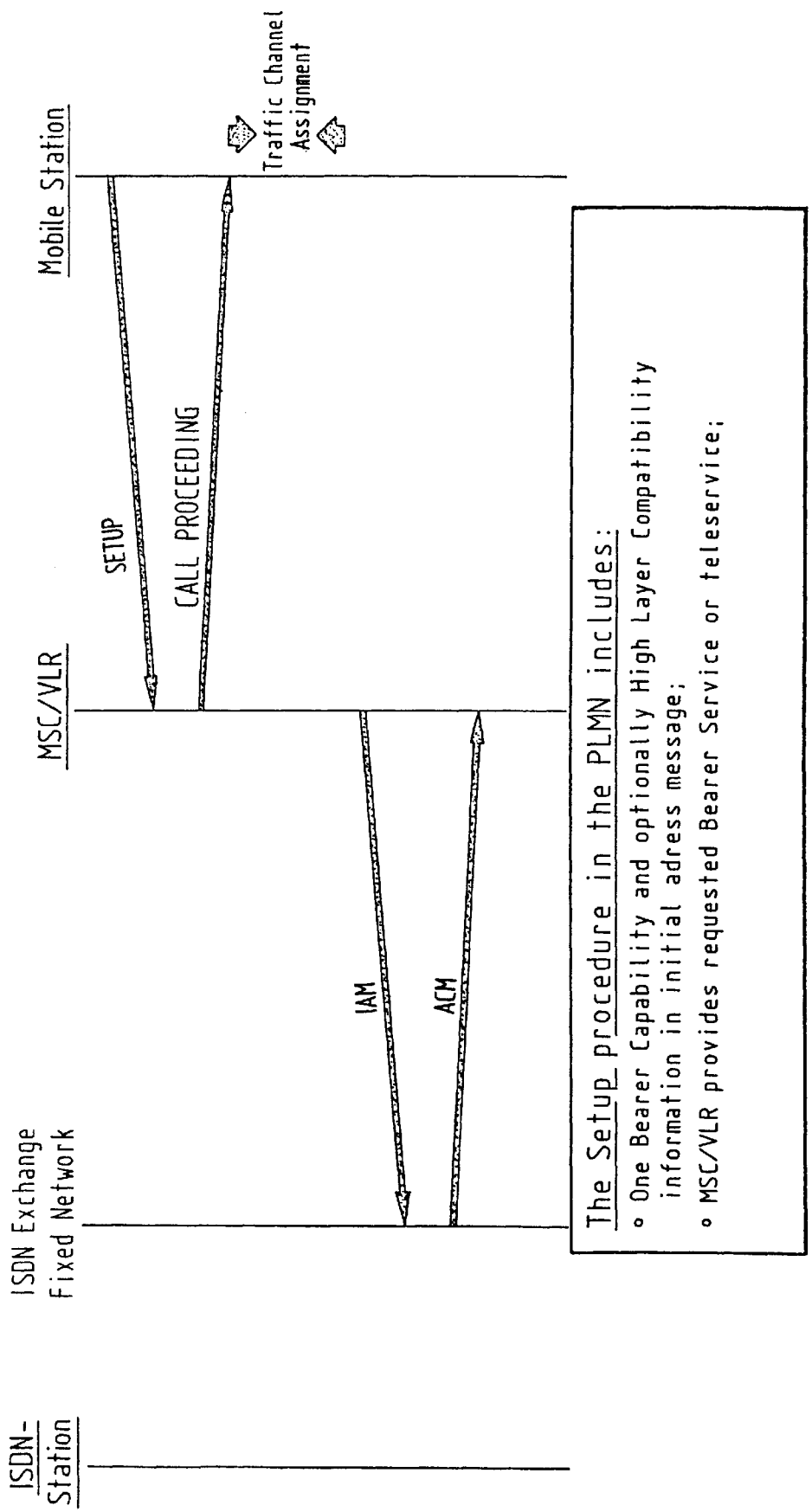
Fig. 6b Mobile Originating Request for a Single-Dialogue Call Establishment
(Prior Art)

| | Bits | | | | | | | | Octets |
|---|---|---|---|---|---|---|---|---|---|
| 8 | 7 | 6 | 5 | 4 | 3 | 2 | 1 | | |
| 0 | 0 | 0 | 0 | Bearer capability | | | 0 | | 1 |
| | | | Information element identifier | | | | | | |
| | Length of the bearer capability contents | | | | | | | | 2 |
| 1 ext. | Coding standart | | | Information transfer capability | | | | | 3 |
| 1 ext. | Transfer mode | | | Information transfer rate | | | | | 4 |
| 1 ext. | | | Rate multiplier | | | | | | 4.1 |
| 0/1 ext. | 0 Layer 1 | 1 ident. | User information layer 1 protocol | | | | | | 5 |
| 0/1 ext. | Synch./ asynch | Negot. | User rate | | | | | | 5a |
| 0/1 ext. | Intermediate rate | | NIC on Tx | NIC on Rx | Flow control on Tx | Flow control on Rx | 0 Spare | | 5b |
| 0/1 ext. | Hdr/no Hdr. | Multi frame | Mode | LLI negot. | Assignor | In-band neg. | 0 Spare | | 5b |
| 0/1 ext. | Number of stop bits | | Number fo data bits | | Parity | | | | 5c |
| 1 ext. | Duplex mode | | Modem type | | | | | | 5d |
| 1 ext. | 1 Layer 2 | 0 ident. | User information layer 2 protocol | | | | | | 6 |
| 1 ext. | 1 Layer 3 | 1 ident. | User information layer 3 protocol | | | | | | 7 |

Fig. 6c Showing the format of a compatability/bearer capability format transmitted from an ISDN-network

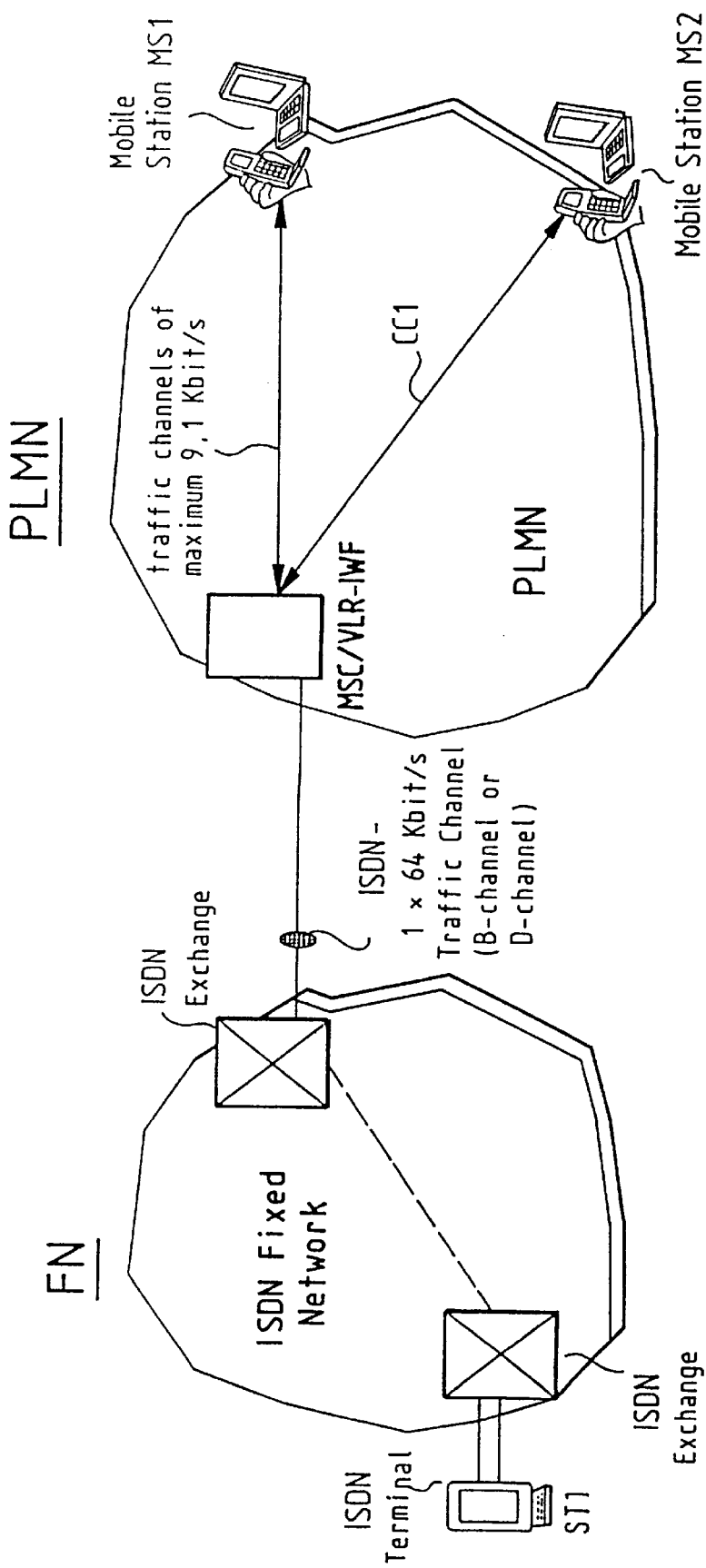
Fig. 7  Prior Art usage of 64 Kbit/s channels for single dialogue calls

COMMUNICATION SYSTEM, MOBILE SERVICES SWITCHING CENTER AND METHOD FOR ESTABLISHING A MULTI-DIALOGUE COMMUNICATION BETWEEN SUBSCRIBER STATIONS

1. FIELD OF THE INVENTION

The invention relates to a communication system, a mobile services switching center and a method for establishing a multi-dialogue communication (communications with several simultaneous dialogues) between a first subscriber station and a second subscriber station through a mobile services switching center of a public land mobile network. Such a communication system can provide in particular mobile subscribers with concurrent multiple dialogues that he/she can utilise parallely in a digital mobile network.

2. BACKGROUND OF THE INVENTION

FIG. 5 shows a typical prior art communication system consisting of a fixed network FN and a public land mobile network PLMN. As is well known, a PLMN can provide to the user or subscriber stations MS1, MS2, ... MSn, a wide range of services and facilities including some that are specific to mobile situations. The PLMNs to which the present invention is applicable comprise the following mobile communication systems:

i) a global system for mobile communications GSM (e.g. GSM 900 MHz; D1 and D2 mobile networks in Germany);

ii) a digital cellular system DCS (DCS 1800 at 1800 MHz; e.g. the E-plus mobile network in Germany); and iii) a personal communications system PCS (e.g. the PCS 1900 MHz personal communication services in the USA).

A call establishment between mobile stations may take place through a fixed network FN connected to the PLMN via a transmission channel CC2. Alternatively, the two mobile stations may also communicate without the aid of a FN, namely through one or several MSCs within the PLMN. The fixed network FN comprises a number of exchanges EX1, EX2 to which are connected the individual subscriber stations ST1, ST2, ... STn. The fixed network provides to the subscribers also a wide range of services and facilities at anyone determined access point. The invention is for example applicable to any of the following fixed networks:

i) an integrated services digital network ISDN;

ii) a packet switched public data network PSPDN.

The interworking between the FN and the PLMN is known in the prior art and detailed in various GSM technical specifications, for example: 02.01: Principles of telecommunication services supported; 02.02: Bearer Services supported by a GSM PLMN; 02.03: Teleservices supported by a GSM PLMN; 04.08: Mobile Radio Interface Layer 3;07.01: General on Terminal Adaptation functions (TAF) for Mobile Stations (MS); 09.07: General requirements on interworking between the Public Land Mobile Network (PLMN) and the Integrated Services Digital Network (ISDN) or Public Switched Telephone Network (PSTN). Furthermore, ITU specifications describe network interface specifications for the call set-up and call control, namely: Specifications of Signalling System No. 7 Recommendation Q.763-Formats and Codes; Q.931: DSS1-ISDN User Network interface layer 3 specifications for basic call control.

Although explained in the aforementioned documents, hereinafter the general entities of a communication system shown in FIG. 5 are briefly explained. One of the most important fixed networks FN currently being used is the integrated services digital network ISDN, which provides the following features:

i) a user-network digital interface;

ii) a standardised output signalling protocol supported between the user and the network, enabling the generation and transport of compatibility information. This compatibility information is used for compatibility checking and terminal/function/service selection; and iii) a standardised output signalling protocol supported within the fixed network. This signalling protocol enables the transport of compatibility information for compatibility checking and terminal/function/ service selection at the user-network interface as well as an interworking function selection.

Of course, the communication between the different units in the communication system in FIG. 5 requires the set-up of network protocols, for example the Signalling System No. 7 is used to transport these protocols. Important network protocols usable with the invention are:

i) ISDN User Part (ISUP);

ii) Mobile Application Part (MAP).

3. SINGLE DIALOGUES BETWEEN SUBSCRIBERS

In order to explain, how a single-dialogue call is set up in the PLMN, some common network features of the PLMN need to be considered, as schematically shown in FIG. 5.

3.1 Network Units Involved

The home location register HLR is a data base used by the PLMN to manage mobile subscribers. A gateway mobile services switching center GMSC is the first mobile services switching center MSC, to which a mobile terminating call is routed. This GMSC interrogates the appropriate HLR and performs the routing function to the very MSC, where the mobile station is located. The said mobile services switching center MSC performs all the switching functions needed for mobiles located in an associated geographical area. Interworking with other networks need the presence of specific functions associated with the MSC. These functions are contained in the interworking function IWF, which is available as hardware/software realisation.

The visitor location register VLR is a data base used by the PLMN to dynamically store information about mobile subscribers, for example the location area where the subscriber is located or is roaming. The VLR also contains information to handle mobile originating and terminating calls. A base station controller BSC is a node that controls various base transceiver stations BTS and performs radio network management. The base transceiver station BTS is the node that handles the radio traffic in any one cell to the mobile stations MS1, MS2, ... MSn via an air-interface, i.e. communication channel or traffic channel CC1. Such an interconnection of HLR, VLR, MSC and a base station system is also disclosed in DE 44 15 734 C1.

3.2 Compatibility Information/Bearer Capability

As will be seen in the following, to set up even a conventional single-dialogue between the mobile station and a subscriber station of the fixed network or between two mobile stations, compatibility information is required in the call set-up messages. The compatibility information is a set of attributes defining the technical (hardware or software) features to support a call. These attributes are included in the bearer capability BC and optionally in the information elements of the high layer compatibility HLC and low layer compatibility LLC. The term compatibility information is used here to indicate the bearer capability and high layer compatibility.

The bearer capability BC is a coding of lower layer attributes used for the characterization of basic services. Thus, the BC defines the technical features of the call, as they appear to the user at the appropriate access point or exchange. An ISDN BC is provided to indicate a requested basic service to be provided by the ISDN network.

By contrast, a mobile BC is to indicate a requested basic service to be provided by the PLMN. In a PCS-network this mobile BC is called the PCS bearer capability, whilst in a GSM/DCS-network this mobile BC is called the GSM bearer capability. Thus, the mobile station BC is a translation of the ISDN BC and contains more attributes representing the technical features of the air-interface of the PLMN. It can be a representation of the ISDN BC, the lower layer compatibility LLC and the higher layer compatibility HLC combined. A typical bearer capability format is shown in FIG. 6c (see page 65 of "Digital Subscriber Signalling System No. 1 (DSS 1)—ISDN User-Network Interface Layer 3, Specification for Basic Call Control ITU-T (International Telecommunication Union) Recommendations Q-931; March 1993), where e.g. the requested "user rate" is specified. Furthermore, the ETSI-document "European digital cellular telecommunication system (Phase 2); General on Terminal Adaptation Functions (TAF) for Mobile Stations (MS) (GSM 07.01), December 1995" lists in the Appendix A on pages 21 to 24 the currently standardised bearer capability elements.

3.3 High layer compatibility/Low layer Compatibility

The information element regarding the high layer compatibility HLC is to provide a means to be used by some remote ISDN subscriber for compatibility checking. It is used for teleservices characterization with the low layer attributes included in the bearer capability.

The purpose of the low layer compatibility information element LLC is to provide a means to be used for compatibility checking by an addressed unit (e.g. a remote user, an interworking unit or a network node higher layer function addressed by the calling user). The low layer compatibility information element is transferred transparently between the call originating unit (e.g. the calling mobile subscriber) and the addressed entity.

3.4 Services Provided in the Networks

Generally, services that can be provided by the networks comprise telecommunication services and so-called basic services.

Telecommunication services are the communication capabilities made available to a subscriber by the network operators.

Some of the telecommunication services are considered very basic services BS, and they are organised in two basic service groups BSGs, namely bearer services which provide the capability of signalling transmission between access points (they are characterized by low OSI-layer attributes) and teleservices, which provide the complete capability including a terminal equipment function for communication between users (they are characterized by both low and high OSI-layer attributes).

When a service (telecommunication service or basic service BS) is made available to a subscriber, an action is taken by the MSC to provide the technical features for allowing such a service to be supplied to the subscriber.

3.5 Assignment of Numbers

For performing a single-dialogue call set-up between a subscriber station of the fixed network FN and the mobile station MS1, MS2, . . . MSn a number assignment must take place.

The mobile station ISDN number MSISDN is the mobile subscriber ISDN identity assigned to a calling subscriber for mobile originating calls or called subscribers for mobile terminating calls.

Likewise, the mobile station roaming number MSRN is the PSTN/ISDN number allocated by the VLR and used to route incoming calls to the serving MSC.

3.6 Channels

All call establishments are made by the use of communication channels CC1, CC2, on the one hand between the mobile stations and the MSC, and on the other hand between the ISDN fixed network and the PLMN.

That is, traffic channels CC1 between the MSC and the mobile stations carry either encoded speech or data in both the uplink or downlink direction. They are defined in the A interface between the MSC and the BSC, the A-bis interface between the BSC and the BTS, and the Um (air interface) between the BTS and the mobile station.

The channels CC2 between the fixed network and the PLMN are (in the case of an ISDN fixed network) the ISDN-channels, namely 64 KBit/s channels (B or D channels).

3.7 Alternate and Sequential Single-dialogue Calls

In this respect, as is shown in FIG. 6a, single dialogue calls are set up between two mobile stations or one mobile station and an ISDN station, wherein the MSC/VLR performs the main function of setting up the calls and providing the individual bearer services for supporting the specific type of call requested by the call originating mobile station.

However, the conventional GSM/DCS and PCS digital mobile networks (see the above-mentioned GSM and ITU specifications) only provide the possibility to provide a single basic service per call between two mobile stations or between a mobile station and an ISDN terminal, when interworking is performed between the PLMN and the ISDN/PSTN networks.

A "dialogue" is herein defined to comprise the utilisation of a single bearer service or teleservice at a time per call. Each dialogue is conventionally provided one at a time to a subscriber, i.e. no parallelism or concurrence of multiple bearer services and/or teleservices is conventionally provided per call.

The subscriber MS1, MS2, . . . MSn can for example establish a speech call (e.g. GSM teleservice 11) or a fax call (e.g. GSM teleservice 62) or alternate between them (e.g. GSM teleservice 61), but conventionally the subscriber cannot utilise both of these teleservices simultaneously.

The GSM/DCS (as explained in the GSM-specification: 02.02: bearer services supported by a GSM PLMN) defines bearer services series 2x (21, 22, 23, 24, etc.), 3x, 4x, 5x, 61 and 81. These standardised bearer services only define a single bearer service per call. In the case of bearer service 61 "alternate speech/data", or bearer service 81 "speech followed by data", indeed two bearer services are provided in a call, however, only alternately or sequentially! No simultaneity or concurrence of more than one bearer services within a single call is conventionally possible. The ETSI-document: European digital cellular telecommunication system (Phase 2); Principles of telecommunication services supported by a GSM Public Land Mobile Network (PLMN) (GSM 02.01), May 1994 describes on page 18, section 6.1 and on page 19 bearer capabilities for such alternate or sequential single dialogues.

The GSM/DCS (as specified in the GSM-specification 02.03: teleservices supported by a GSM PLMN) defines teleservices 11—for speech, 12—for emergency calls, and 61 and 62 —for facsimile group 3. These standardised teleservices also only define a single (!) teleservice per call. In the case of teleservice 61 "alternate speech/facsimile group 3" two teleservices are provided in a call (alternately), but again no simultaneity or concurrence of more than one teleservices within a single call is offered. Thus, no possibility is currently available in all GSM specification to support simultaneously or parallely more than one bearer service per call.

3.8 Conventional Set-Up of Single-Dialogue Calls

As is seen in FIG. 6b, first the mobile station sends a set-up request to the mobile services switching center MSC/visitor location register VLR, whereafter an initial address message IAM is sent to the ISDN exchange in the fixed network FN. An address complete message ACM is returned and the call proceeds thereafter. As explained, even with sophisticated GSM-specifications, only a single bearer service or teleservice can be set up. That is, the initial address message IAM sends a requested bearer capability and optionally a high layer compatibility information, whereafter the required features in the PLMN or the FN needed for supporting that type of call (as defined by the bearer capability) are provided.

3.9 Use of Channels for Single-Dialogue Calls

FIG. 7 shows the conventional use of channels for a single-dialogue call. One B-channel is used between the ISDN-network and the PLMN-network and one traffic channel is respectively used to connect the mobile stations to the MSC/VLR.

4. SUMMARY OF THE INVENTION

Thus, as summarised and described in FIG. 7, in the prior art communication system there is only available one communication channel between the ISDN exchange and the MSC and thus, there is a restriction for non-concurrency basically due to the two following disadvantages:

- the limited user rates currently provided by digital mobile systems, i.e. the maximum access user rate of 9.6 KBit/s on the traffic channels;
- the fixed ISDN network could not provide, until recently standardised, a multirate scheme to handle and maintain the integrity of more than one ISDN channel per call.

This means, that so far there are no features available in the mobile GSM/DCS/PCS networks to provide the. establishment of several concurrent dialogues between two mobile stations or a mobile station and an ISDN terminal connected to the ISDN fixed network. For example, two simultaneous dialogues, one dialogue providing a bearer service of the type "video" and another dialogue of a teleservice "speech" could not be provided simultaneously.

Therefore, the object of the present invention is:

- to provide a communication system, a mobile services switching center and a method that allow the establishing of multi-dialogue calls in digital mobile networks between two mobile stations or between a mobile station and a subscriber to the fixed network.

5. SOLUTION OF THE OBJECT

This object is solved by a communication system for performing a multi-dialogue communication between a first subscriber station and a second subscriber station through a Mobile services Switching Center of a public land mobile network, comprising:

a) at least one first communication channel provided between the first subscriber station and the Mobile Services Switching Center;

b) at least one second communication channel provided between the second subscriber station and the Mobile Services Switching Center; wherein c) the Mobile Services Switching Center comprises a mapping means for performing said multi-dialogue communication by setting up a requested number of concurrent single-dialogues on a corresponding number of said second communication channels; and mapping said requested number of single-dialogues as a single call on said second communication channels onto said at least one first communication channel.

Furthermore, this object is solved by a Mobile services Switching Center of a public land mobile network connected via at least one first communication channel with a first subscriber station and via at least one second communication channel with a second subscriber station, for performing a multi-dialogue communication between said first subscriber station and said second subscriber station, comprising:

a mapping means for performing the multi-dialogue communication by setting up a requested number of concurrent single-dialogues on a corresponding number of the second communication channels and mapping said requested number of single-dialogues as a single call on the second communication channels onto said at least one first communication channel.

This object is also solved by a method for establishing a multi-dialogue communication between a first subscriber station and a second subscriber station through a Mobile Services Switching Center of a public land mobile network, comprising:

a) sending a multi-dialogue call set-up message from the first subscriber station to said Mobile Services Switching Center indicating the number of concurrent single dialogues to be set up;

b) receiving said multi-dialogue call set-up message in the Mobile Services Switching Center and identifying the types of said requested single dialogues; and c) successively assigning said types of requested single dialogues to a corresponding number of second communication channels between the Mobile Services Switching Center and the second subscriber station; and d) mapping said requested number of single-dialogues on said second communication channels onto at least one first communication channel between the first subscriber station and the Mobile Services Switching Center.

This object is also solved by a communication system for performing a multi-dialogue communication between a first subscriber station and a second subscriber station through a Mobile services Switching Center of a public land mobile network, comprising:

a) at least one first communication channel provided between the first subscriber station and the Mobile Services Switching Center;

b) at least one second communication channel provided between the second subscriber station and the. Mobile Services Switching Center; wherein, c) the Mobile Services Switching Center comprises a mapping means for performing said multi-dialogue communication by setting up a requested number of concurrent single-dialogues on a corresponding number of said second communication channels; and mapping said requested number of single-dialogues as a single call on said second communication channels onto said at least one first communication channel; wherein the first subscriber station is a mobile radio station of the public land mobile network and the second subscriber station is a subscriber station of a fixed network connected to the public land mobile network via a fixed network exchange; and said mapping means performs a mapping of mobile compatibility information of said mobile station and ISDN/ISUP bearer capabilities and High Layer compatibility information of said fixed network subscriber station.

This object is also solved by a communication system for performing a multi-dialogue communication between a first subscriber station and a second subscriber station through a Mobile services Switching Center of a public land mobile network, comprising:

a) at least one first communication channel provided between the first subscriber station and the Mobile Services Switching Center;

b) at least one second communication channel provided between the second subscriber station and the Mobile Services Switching Center; wherein c) the Mobile Services Switching Center comprises a mapping means for performing said multi-dialogue communication by setting up a requested number of concurrent single-dialogues on a corresponding number of said second communication channels; and mapping said requested number of single-dialogues as a single call on said second communication channels onto said at least one first communication channel; wherein the first subscriber station is a mobile radio station of the public land mobile network and the second subscriber station is a subscriber station of a fixed network connected to the public land mobile network via a fixed network exchange;

the first mobile station is provided for transmitting a multi-dialogue call establishment request message to the Mobile Services Switching Center for requesting a multi-dialogue communication to the second subscriber station of said fixed network; and the second subscriber station of said fixed network is provided for transmitting a multi-dialogue call establishment request message to the Mobile Services Switching Center for requesting a multi-dialogue communication to the first mobile station.

This object is also solved by a communication system for performing a multi-dialogue communication between a first subscriber station and a second subscriber station through a Mobile services Switching Center of a public land mobile network, comprising:

a) at least one first communication channel provided between the first subscriber station and the Mobile Services Switching Center;

b) at least one second communication channel provided between the second subscriber station and the Mobile Services Switching Center; wherein c) the Mobile Services Switching Center comprises a mapping means for performing said multi-dialogue communication by setting up a requested number of concurrent single-dialogues on a corresponding number of said second communication channels; and mapping said requested number of single-dialogues as a single call on said second communication channels onto said at least one first communication channel; wherein the first subscriber station is a mobile radio station of the public land mobile network and the second subscriber station is a subscriber station of a fixed network connected to the public land mobile network via a fixed network exchange;

the first mobile station is provided for transmitting a multi-dialogue call establishment request message to the Mobile Services Switching Center for requesting a multi-dialogue communication to the second subscriber station of said fixed network;

the second subscriber station of said fixed network is provided for transmitting a multi-dialogue call establishment request message to the Mobile Services Switching Center for requesting a multi-dialogue communication to the first mobile station; and said multi-dialogue call establishment request message comprises several sets of compatibility information, each set defining a distinct single dialogue of said requested multi-dialogue call, and a multi-dialogue-call indicator indicating a multi-dialogue request.

This object is also solved by a communication system for performing a multi-dialogue communication between a first subscriber station and a second subscriber station through a Mobile services Switching Center of a public land mobile network, comprising:

a) at least one first communication channel provided between the first subscriber station and the Mobile Services Switching Center;

b) at least one second communication channel provided between the second subscriber station and the Mobile Services Switching Center; wherein c) the Mobile Services Switching Center comprises a mapping means for performing said multi-dialogue communication by setting up a requested number of concurrent single-dialogues on a corresponding number of said second communication channels; and mapping said requested number of single-dialogues as a single call on said second communication channels onto said at least one first communication channel; wherein both the first and second subscriber stations are mobile stations of the public land mobile network;

the first mobile station is provided for transmitting a multi-dialogue call establishment request message to the Mobile Services Switching Center for requesting the multi-dialogue communication to the second mobile station; and said multi-dialogue call establishment request message comprises several sets of compatibility information, each set defining a distinct single dialogue of said requested multi-dialogue call, and a multi-dialogue-call indicator indicating a multi-dialogue request.

This object is also solved by a method for establishing a multi-dialogue communication between a first subscriber station and a second subscriber station through a Mobile Services Switching Center of a public land mobile network, comprising:

a) sending a multi-dialogue call set-up message from the first subscriber station to said Mobile Services Switching Center indicating the number of concurrent single dialogues to be set up;

b) receiving said multi-dialogue call set-up message in the Mobile Services Switching Center and identifying the types of said requested single dialogues; and c) successively assigning said types of requested single dialogues to a corresponding number of second communication channels between the Mobile Services Switching Center and the second subscriber station; and d) mapping said requested number of single-dialogues on said second communication channels onto at least one first communication channel between the first subscriber station and the Mobile Services Switching Center; wherein both said first and second subscriber stations are mobile stations of said public land mobile network; and further comprising the step of transmitting from the first mobile station a multi-dialogue call establishment request message to the Mobile Services Switching Center for requesting the multi-dialogue communication to the second mobile station; wherein in the multi-dialogue call establishment request message several sets of compatibility information, each defining a distinct single dialogue of said requested multi-dialogue call, and a multi-dialogue-call indicator indicating a multi-dialogue request are sent.

This object is also solved by a method for establishing a multi-dialogue communication between a first subscriber station and a second subscriber station through a Mobile Services Switching Center (MSC) of a public land mobile network, comprising:

a) sending a multi-dialogue call set-up message from the first subscriber station to said Mobile Services Switching Center indicating the number of concurrent single dialogues to be set up;

b) receiving said multi-dialogue call set-up message in the Mobile Services Switching Center and identifying the types of said requested single dialogues; and c) successively assigning said types of requested single dialogues to a corresponding number of second communication channels between the Mobile Services Switching Center and the second subscriber station; and d) mapping said requested number of single-dialogues on said second communication channels onto at least one first communication channel between the first subscriber station and the Mobile Services Switching Center; wherein said first subscriber station is a first mobile station of said public land mobile network; and further comprising the step of transmitting from the first mobile station a multi-dialogue call establishment request message to the Mobile Services Switching Center for requesting the multi-dialogue communication to a second subscriber station of a fixed network connected to the public land mobile network via a fixed network exchange; wherein in the multi-dialogue call establishment request message several sets of compatibility information, each defining a distinct single dialogue of said requested multi-dialogue call, and a multi-dialogue-call indicator indicating a multi-dialogue request are sent.

This object is also solved by a method for establishing a multi-dialogue communication between a first subscriber station and a second subscriber station through a Mobile Services Switching Center of a public land mobile network, comprising:

a) sending a multi-dialogue call set-up message from the first subscriber station to said Mobile Services Switching Center indicating the number of concurrent single dialogues to be set up;

b) receiving said multi-dialogue call set-up message in the Mobile Services Switching Center and identifying the types of said requested single dialogues; and c) successively assigning said types of requested single dialogues to a corresponding number of second communication channels between the Mobile Services Switching Center and the second subscriber station; and d) mapping said requested number of single-dialogues on said second communication channels onto at least one first communication channel between the first subscriber station and the Mobile Services Switching Center; wherein said first subscriber station is a first mobile station of said public land mobile network; and further comprising the step of transmitting from a second subscriber station of a fixed network connected to the public land mobile network via a fixed network exchange a multi-dialogue call establishment request message to the Mobile Services Switching Center for requesting said multi-dialogue communication to said first mobile station; wherein in the multi-dialogue call establishment request message several sets of compatibility information, each defining a distinct single dialogue of said requested multi-dialogue call, and a multi-dialogue-call indicator indicating a multi-dialogue request are sent.

6. ADVANTAGES OF THE SOLUTION

Essentially, according to the invention a mapping means is used for receiving a call set-up message that can comprise several sets of bearer capabilities, wherein the mapping means allocates the corresponding bearer services or teleservices to a number of traffic channels existing between the mobile station and the mobile services switching center. Several traffic channels between the mobile station and the MSC are used for the multi-dialogue, whereby at least one communication channel between the fixed network and the PLMN is-used. Thus, the user can for example simultaneously receive a video service and a speech teleservice.

Further advantageous embodiments and improvements of the invention are listed in the dependent claims. Hereinafter, advantageous and illustrative embodiments of the invention will be described with reference to the attached drawings.

7. BRIEF DESCRIPTION OF THE DRAWINGS

FIG. 1 shows an embodiment of the present invention, where a communication system uses a mobile services switching center comprising a mapping means MP for allowing multi-dialogues between a first subscriber and a second subscriber;

FIG. 2 shows an embodiment of the present invention, where a video service and a speech service are simultaneously provided between a mobile station of a PLMN and an ISDN fixed network exchange;

FIG. 3a shows a multi-dialogue call for two simultaneous data transmissions between a mobile station MS1 and an ISDN terminal ST1;

FIG. 3b shows a multi-dialogue call for a speech and video transmission (video telephony) between a mobile station MS1 and an ISDN terminal ST1;

FIG. 4a shows an embodiment of a method for establishing a multi-dialogue call between a mobile station and the ISDN exchange (or the ISDN terminal connected thereto);

FIG. 4b shows an embodiment of a multi-dialogue call establishment between the fixed network exchange and the mobile station;

FIG. 4c shows a flow chart for mapping PLMN traffic channels and ISDN B-channels;

FIG. 5 shows a conventional communication system consisting of FN/PLMN networks;

FIG. 6b shows a conventional establishment of a single-dialogue call;

Figure 6A:
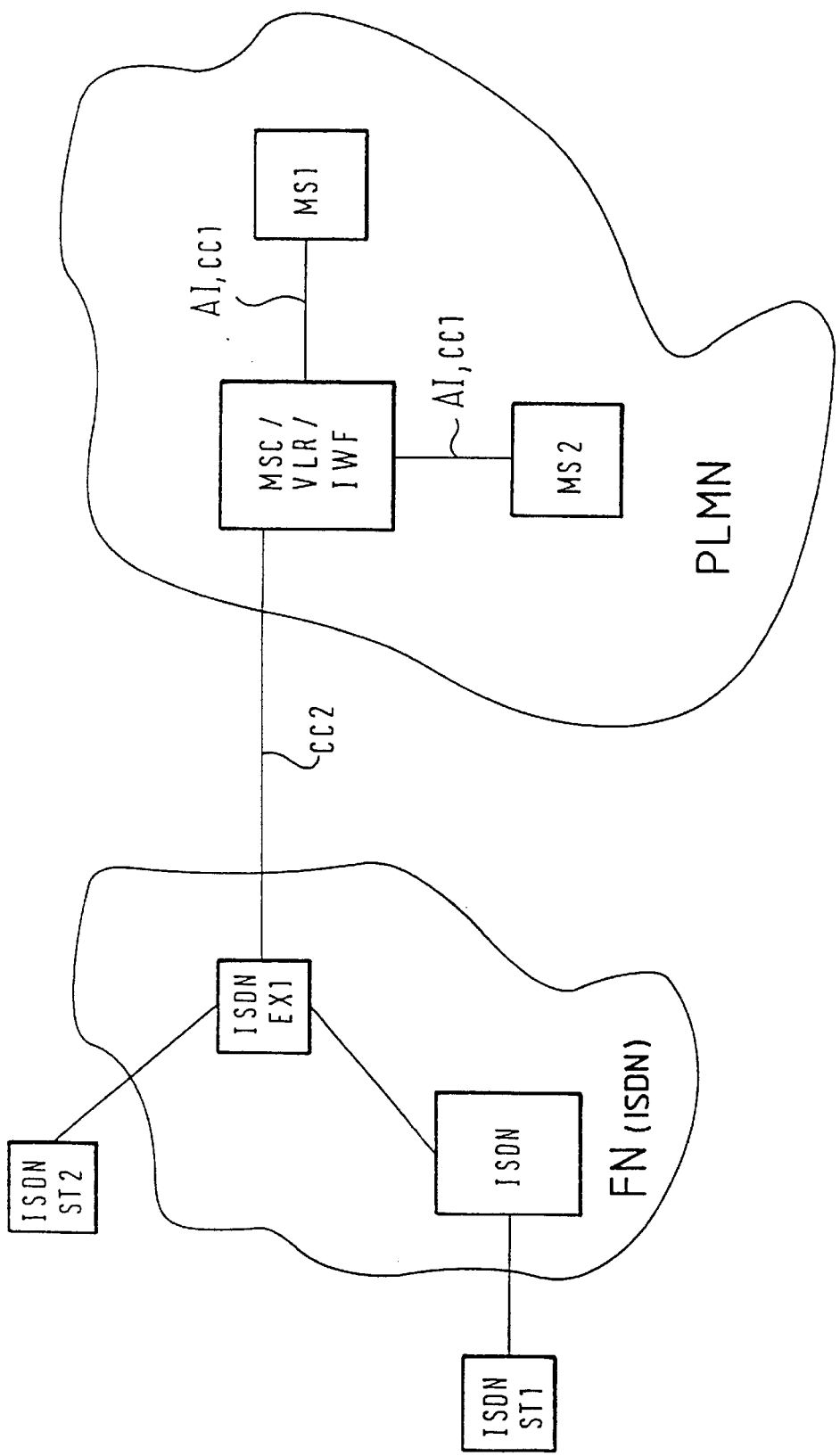
FIG. 6a shows a simplified block diagram of FIG. 5 showing two mobile stations MS1, MS2 performing single-dialogue communications between each other and with an ISDN station ST1, ST2 via a first and second communication channel CC1, CC2, respectively.

FIG. 6c a typical bearer capability format in an ISDN-network; and

FIG. 7 the conventional use of a 64 KBit/s B-channel (or a D-channel) for a single dialogue call.

8. BEST MODE FOR CARRYING OUT THE INVENTION

In the following description, the same reference numerals as in FIGS. 5 to 7 are used for identifying the same or corresponding parts.

8.1 Multi-Dialogue Channel Mapping

FIG. 1 shows a general overview of an inventive communication system for providing a multi-dialogue communication between a first subscriber station MS1, MS2, . . . MSn and a second subscriber station MS2, ST1, ST2, . . . STn. The arrangement of the communication system corresponds to the communication system shown in FIG. 6a, i.e. the first subscriber station MS1 can be a first mobile station MS1 of the PLMN, while the second subscriber station MS2, ST1, ST2, . . . STn can be a second mobile station of the PLMN or indeed a subscriber station of the fixed network FN. Thus, the communication system in FIG. 1 enables a multi-dialogue communication between two mobile stations and/or between one mobile station and a subscriber station of the fixed network. At least one first communication channel CC1 connects the first subscriber station MS1 to the MSC/VLR, while at least one second communication channel CC2 connects the second subscriber station MS2, ST1, ST2 to the MSC/VLR.

The MSC/VLR contains a mapping means MP for performing a multi-dialogue communication between the subscribers. It should be noted that it is only necessary to provide at least one first communication channel CC1 between the first subscriber station MS1 and the MSC/VLR and at least one second communication channel CC2 between the second subscriber station and the MSC/VLR in order to allow said multi-dialogue communication to take place between two mobile stations or between a subscriber station of the fixed network and the mobile station. The capability of performing said multi-dialogue communication is also independent from the fact, whether it is the mobile station or the subscriber station of the fixed network that originates the multi-dialogue call. Thus, the configuration in FIG. 1 is fully bi-directional. Essentially, the mapping means MP enables said multi-dialogue communication by using at least one first and second communication channel CC1, CC2, when a plurality of concurrent single-dialogues are requested by the calling subscriber. The mapping means MP maps single-dialogues on the at least one first communication channel CC1 as a single call to at least one second communication channel CC2, as is schematically indicated in FIG. 1. That is, the multi-dialogue communication is set up by setting up single-dialogues parallely as a single call on the at least one second communication channel CC2, whereas they are mapped onto at least one first communication channel CC1 by the mapping means MP.

This means that in a method for performing a multi-dialogue communication, the mapping means MP for example first receives a multi-dialogue call set-up request from a subscriber, containing a number of sets of bearer capabilities and optionally high layer compatibility information regarding each of the single-dialogues to be performed concurrently, as well as a multi-dialogue call indicator, indicating that a multi-dialogue call is requested. With such a multi-dialogue call set-up request a number of basic services to be used concurrently, i.e. in parallel, by the mobile subscriber is requested. The MSC/VLR then assigns the individual services, i.e. the telecommunication services and basic services (bearer services and teleservices) requested by the sets of bearer capability and high layer compatibility informations individually to the at least one second communication channel CC2. Thus, several basic services or teleservices may be performed parallely or concurrently in response to the multi-dialogue call set-up request, i.e. the multi-dialogue communications can take place. The manner how the multi-dialogue call set-up is performed step-by-step will be explained in detail further below.

It should however be noted that FIG. 1 is a general configuration that allows a multi-dialogue communication between a PLMN and the same PLMN via for example the same MSC/VLR-IWF (i.e. no interaction is needed to/from the fixed ISDN network), between a PLMN and another PLMN (via a fixed ISDN network), or, indeed, between a PLMN and an ISDN fixed network. Thus, the inventive mapping means incorporated in the mobile services switching center MSC/VLR is applicable for achieving a multi-dialogue communication between subscribers for any of the possible combinations of networks mentioned above.

8.2 Mapping of PLY traffic channels & 64 KBit/s ISDN channels

FIG. 2 shows an embodiment of the invention, where the second subscriber station ST1 is connected to an ISDN fixed network exchange, wherein the second communication channels are constituted by at least one 64 KBit/s ISDN channels, wherein the first communication channels are constituted by PLMN traffic channels in the A-A-bis-Um (radio) interfaces and wherein the first subscriber station is constituted by a mobile station. The ISDN channels may be ISDN B-channels or ISDN D-channels. Although FIG. 2 shows the mapping of a teleservices "speech" and a service "video" between the PLMN and the ISDN fixed network, it should be understood that the embodiment is not limited to such a combination. For the general case in FIG. 1 as well as for the embodiment in FIG. 2, the following combinations of services are possible:

i) speech and video, or
ii) data transfer and video, or
iii) facsimile and video, or
iv) simultaneous dialogues for data transfers, or
v) speech and data transfers.

In FIG. 2, the mapping is performed upon the PLMN traffic channels between a mobile station MS1, MS2, . . . MSn and the MSC/VLR and the ISDN 64-KBit/s B-channels in the fixed ISDN network. In FIG. 2 a video telephony service is offered in a multi-dialogue call, in this case a two-dialogue call—one for the speech service (teleservice 11 in the digital mobile system GSM/DCS) and a second one for a video service (not standardised in the digital mobile system GSM/DCS). In the embodiment in FIG. 2 five traffic channels are used in the A interface—A-bis interface—Um (radio) interface. They are numbered "1" to "5". Two 64 KBit/s B-channels are shown between the MSC/VLR and the originating/ terminating ISDN fixed network exchange. The MSC/VLR performs a mapping among the channels allowing the multi-dialogue call connection establishment for two basic services between the PLMN and the ISDN fixed network.

For performing the multi-dialogue call set-up establishment the MSC/VLR first identifies the number of basic services that are requested or offered by/to the mobile station. This is done by the MSC/VLR identifying the sets of bearer capabilities and optionally the high layer compatibility informations per offered (requested) bearer service or teleservice. Once the requested basic services are identified, the channels are mapped. In this case the traffic channel "1" carrying "speech" is mapped to the ISDN B-channel "1". Traffic channels "2", "3", "4" and "5" are mapped to the ISDN B-channel "II".

FIG. 2 shows the case where two ISDN B-channels are used for the two single dialogues. Depending on the characteristics of the sets of bearer capabilities, the MSC/VLR assigns the number of B-channels. However, it is conceivable to only use one B-channel in the simplest case, for example when a compression is used on this channel.

A simple illustration of the mapping in FIG. 2 is as follows: The MSC/VLR receives a multi-dialogue request which contains a number of sets of bearer capabilities and an indication how many traffic channels are available. In FIG. 2, the mobile station requests five traffic channels. One of the bearer capabilities in the set requesting the video service is e.g. the required transmission speed of say 36.4 kBit/s and likewise one of the bearer capabilities for the set requesting the speech service is the required transmission speed of 2.4 kBit/s. Hence, the mapper will assign two B-channels (one for each service) and will decide that four traffic channels of 9.1 kBit/s need to be used for the video service and one traffic channel need to be used for the speech service.

Of course, in general the parameters of the requested service as defined in the respective set of bearer capabilities are not only the transmission speed, but various other parameters. Therefore, the mapper, when it has identified from the bearer capabilities which kind of service is requested, distributes or "maps" the required technical features "over" the number of traffic channels which have been indicated by the mobile station. This means that the mapper makes a mapping of the one B-channel to several traffic channels, but it uses these traffic channels "commonly" for supporting all technical features of the required call as defined by the set of bearer capabilities, i.e. for supporting the speed: four traffic channels, and possibly for supporting the synchronisation etc. only two of the total four traffic channels. Thus, the mapper distributes the technical features "over" the available number of traffic channels.

It should also be noted that, while the use of one traffic channel is known for one single dialogue as mentioned above e.g. for high-speed circuit switched data (HSCSD) systems, (it is e.g. also detailed in the ETSI-document "European digital cellular telecommunication system (Phase 2); GSM Public Land Mobile Network (PLMN) (GSM 03.10), May 1994" on page 16, section 4.1 that per connection, i.e. per call one traffic channel is used) it is the inventive mapper that allows to determine from the sets of bearer capabilities the number of concurrent single dialogues and to determine how many traffic channels per each single dialogue are needed and to distribute and use these determined traffic channels for the individual technical features needed to support the requested singe-dialogue. Thus, the invention concept is not simply based on the use of one or more B-channels and one or more traffic channels but on the mapping of the channels for supporting the individual technical features per each requested dialogue.

A step-by-step description of how the call set-up for such a multi-dialogue communication is carried out will be further explained below.

8.3 Description of Simple Multi-Dialogue Calls

Whilst FIG. 2 serves the general explanation of how the mapping is being performed between a ISDN fixed network and the PLMN, some specific embodiments for illustration purposes are hereinafter explained with reference to FIGS. 3a, 3b.

FIG. 3a shows an embodiment with a call, where two data dialogue transmissions take place simultaneously. In this case, two radio traffic channels "1" and "2" are used between a mobile station MS1 and the MSC/VLR-IWF. Likewise, two 64 KBit/s traffic channels (B-channels) are used between the ISDN exchange and the MSC/VLR-IWF. Here, the mapping performed by the mapping means MP is comparatively simple, since it assigns the traffic channel "1" (data dialogue 1) to the first B-channel and the traffic channel "2" (data dialogue 2) to the second B-channel. However, MP may assign both traffic channels to one B-channel as was generally described above with reference to FIG. 2.

FIG. 3b on the other hand shows the more complicated and general form as depicted in FIG. 2. Here, a speech dialogue and a video dialogue take place simultaneously. In this case five radio channels "1" to "5" are used between the mobile station and the MSC/VLR-IWF. One radio traffic channel for the speech dialogue and four traffic channels for the video dialogue are used. The traffic channels between the mobile station MS1 and the MSC/VLR (including the A interface, the Abis interface and the Um air interface) are mapped by the MSC/VLR to a plurality of 64 KBit/s channels towards the fixed ISDN network and thus towards the ISDN-station ST1. As explained, the mapping is done on the basis of the utilised bearer services or teleservices required by the multiple-dialogue call.

It should be noted that the concept illustrated in FIG. 3b and in FIG. 2 is not based on the simultaneous use of time slots in the air interface which are provided by the high speed circuit switched data (HSCSD) feature in GSM, which currently undergoes standardisation. By contrast, the present invention is not directed to the simultaneous use of time slots in the air interface, but it is based on a concept of concurrently utilising several basic services for multiple dialogues, which has so far not been considered for standardisation.

When a multi-dialogue communication is to be set up in FIG. 3b, the associated 64 KBit/s channels from the MSC/VLR towards the ISDN fixed network are provided by the multirate ISDN connection type. That is, each set of compatibility information included in the call set-up request indicates a different 64 KBit/s B-channel to be used in the multi-dialogue call. That is, the number of mobile bearer capabilities (optionally in combination with high layer compatibility information) is an indication of the number of single-dialogues requested for the multi-dialogue call, whereas the mobile bearer capability information (possibly in combination with the higher layer compatibility information) itself indicates the type of call, i.e. it indicates to the MSC/VLR which technical features need to be provided to support the specific types of calls that have been requested.

8.4 Multi-Dialogue Call Establishment Procedure

FIG. 4a shows an embodiment of a method for establishing a multi-dialogue communication between a mobile station and an ISDN subscriber station through an ISDN exchange of a fixed network (see for comparison the set-up, procedure shown in FIG. 6b for single-dialogues). The call set-up procedures including the exchange of messages (like IAM, ACM etc.) is normally performed over signalling channels provided independently to the communication channels CC1, CC2. However, the communication channels may be used for this.

FIG. 4a shows the case of a mobile station request for a multi-dialogue mobile originating call, i.e. here the mobile station originates a request for a multi-dialogue. The set-up message SET-UP indicates to the MSC/VLR-IWF that a multi-dialogue service is requested by the mobile station (the multi-dialogue indicator is included in the SET-UP message). As explained, the setup message includes sets of compatibility information (i.e. sets of mobile bearer capability information and optionally high layer compatibility information), indicating the technical features of several single-dialogues to be performed concurrently. Each set thus represents a distinct requested single-dialogue.

That is, if the multi-dialogue request is issued from the mobile station, the set-up message will include a set of mobile bearer capabilities and when it is issued from an ISDN-station, it will include a set of ISDN-bearer capabilities. Such ISDN bearer capabilities are disclosed in the ITU-T document "Digital subscriber signalling system no. 1 network layer; Digital subscriber signalling system no. 1 (DSS 1)—ISDN user-network interface layer 3 specification for basic call control, ITU-I Recommendation Q-931, March 1993"1 on pages 65 to 68.

As also explained, the message includes a multi-dialogue indicator, which defines the request as a multi-dialogue call request by contrast to a single-dialogue call request. This makes the request unique and unambiguous in relation to an alternate or dual service (for example the bearer service 61 "alternate speech/data" or the bearer service 81 "speech followed by data"), which are intrinsically non-simultaneous single-dialogues. The multi-dialogue indicator thus distinguishes the set-up message from an alternate or dual call as standardised in GSM/DCS digital mobile systems, where a single basic service at a time is provided to the subscriber.

8.5 Allocation of the B-Channels

A mapping is thus done between the mobile compatibility information and the ISDN/ISUP bearer capabilities and high layer compatibility information. (The multi-dialogue call establishment process performed by the MSC/VLR-IWF will further below be explained with reference to FIGS. 4b, 4c).

The multirate ISDN feature is used to allocate the multiple B-channels in the set-up procedure shown in FIG. 4a. For setting up all single-dialogues, a set-up message, initial address message IAM and address complete message ACM are sequentially generated for the several dialogues to be performed concurrently. The MSC/VLR indicates a multirate call to the ISDN originating exchange by using the parameters of the User Service Information, User Service Information Prime, Access Transport, User Teleservice Information and Transmission Medium Requirements (the ITU-T document "Specifications of signalling system no. 7; Formats and codes of the ISDN user part of signalling system no. 7, ITU-T Recommendation Q.763, March 1993" describes on pages 9, 10, 56, 57, 58 the format of these parameter fields).

8.6 Establishment of a Mobile Terminating Call with a Multi-Dialogue

FIG. 4b shows an example where a multi-dialogue communication is set up, when the call is originated from an ISDN-station through the ISDN exchange, and is directed or terminated at the mobile station. The ISDN terminating exchange sends an initial address message IAM to the gateway mobile services switching center GMSC. As explained, this multi-dialogue call set-up message includes compatibility information related to the multi-dialogue call. This information includes the user service information, user service information prime, access transport, user teleservices information and transmission medium requirement parameters indicating a multirate call from the ISDN fixed network.

Although in FIG. 4b there is shown the ISDN-station that originates the multi-dialogue call, FIG. 4b may also be applicable to the situation where a mobile station requests a multi-dialogue call to be set up to another mobile station of the same PLMN, since—as explained before—the call set-up between mobile station-to-mobile station may also be done through the ISDN exchange. Thus, the mobile terminating situation of FIG. 4b also covers the mobile station-to-mobile station situation using the ISDN fixed network, because there exists symmetry and analogy in the multi-dialogue mobile originating call establishment handling.

The home location register HLR stores subscription information related to the multi-dialogue call (that is, the HLR stores information that indicates which types of calls the subscriber has paid for, i.e. video/speech, data exchange . . . ). This subscription information is transferred to the MSC/VLR in the Insert Subscriber Data message and when mobile terminating calls are received by the PLMN, the Provide Roaming Number Message PRN transfers multi-dialogue compatibility information to the MSC/VLR, such that the mapping means up can set up the individual requested single-dialogues on the traffic channels via the traffic channel assignment.

As always, the Provide Roaming Number Message PRN contains a mobile station ISDN number MSISDN, which is the mobile subscriber ISDN identity assigned to a calling subscriber for mobile originating calls or called subscribers for mobile terminating calls. If incomplete compatibility information is received by the HLR from the GMSC (due to the network interfaces between the fixed network and the PLMN sometimes not being capable to transfer the complete compatibility information), then the conventional multi-numbering scheme or single-numbering scheme or an HLR contour selection may be used by the HLR, as is described in a parallel application DE 19 617 798.7 in the name of the same applicant, which is herein included via reference.

As is indicated in FIG. 4b, after receiving the roaming number from the MSC, a roaming information acknowledgement ACK is sent to the GMSC, whereafter the initial address message IAM is sent to the MSC, which subsequently performs the traffic channel assignment for the individual single-dialogues requested by the ISDN exchange. Finally, an address complete message ACM is transferred back to the ISDN exchange indicating that the multi-dialogue call establishment has been completed and that the mapping of the traffic channels to the ISDN channels has been successfully established.

It is apparent from FIGS. 4b, 4a that only one initial address message IAM is sent for setting up the traffic channels and ISDN-channels to allow the multi-dialogue to take place.

8.7 Mapping of Channels for a Speech/Video Multi-dialogue

FIG. 4c is an embodiment of the method of the invention, where the set-up of a speech and video multi-dialogue call is shown for which the mapping has been generally indicated in FIG. 2. That is, FIG. 4c provides details on the actions of the MSC/VLR to perform the mapping among PLMN traffic channels and 64 KBit/s ISDN B-channels. The compatibility information needed for a digital mobile video telephony call in the PLMN is also described.

After starting the set-up procedure in step S1, in step S2 the MSC/VLR-IWF receives from the mobile station MS1, MS2 a call set-up request SET-UP for a multi-dialogue service, i.e. the call set-up request contains the multi-dialogue call indicator, which in the set-up, call proceeding, call confirmed, provide roaming number, insert subscriber data and the corresponding acknowledgement messages identifies the related service request/offer as a multi-dialogue call and bearer capability/high layer compatibility information indicating the type of single-dialogues.

The characteristics presented to the MSC/VLR-IWF per mobile bearer capability/high layer compatibility information include as parameters the following indications:

the number of traffic channels required by the multi-dialogue;

type of coding in each traffic channel;

transfer mode;

transfer rate;

information transfer capability;

structure;

establishment;

configuration;

user information layer 1 protocol;

user information layer 2 protocol;

user information layer 3 protocol;

signalling access protocol;

type of user information;

extended audiovisual characteristics identification.

In step S3 a negotiation or signalling between the MSC/VLR-IWF and the mobile station takes place using the call proceedings message sent to the calling mobile station as in conventional GSM/DCS/PCS systems. Thereafter, the channel mapping takes place in step S4.

In step S4 the MSC/VLR-IWF assigns a 64 KBit/s ISDN B-channel per single-dialogue requested by the mobile station MS. The ISDN B-channel mapping is then (e.g. for video telephony):

number of mobile bearer capabilities→number of dialogues→number of ISDN B-channels.

This is the mapping process performed by the mapping means in FIG. 2. The characteristics presented by the MSC/VLR per ISDN bearer capability/high layer compatibility information for the speech dialogue include the following parameters:

transfer mode;

transfer rate;

information transfer capability;

structure;

establishment of communication;

symmetry;

configuration of communication;

user information layer 1 protocol;

user information layer 2 protocol;

user information layer 3 protocol;

type of user information;

extended audiovisual characteristics identification.

Likewise, the characteristics presented by the MSC/VLR per ISDN bearer capability/high layer compatibility information for the video-dialogue comprise the same parameters as mentioned above, i.e.

transfer mode;

transfer rate;

information transfer capability;

structure;

establishment of communication;

symmetry;

configuration of communication;

user information layer 1 protocol;

user information layer 2 protocol;

user information layer 3 protocol;

type of user information;

extended audiovisual characteristics identification.

The MSC/VLR-IWF generates the above call characteristics to the ISDN network by signalling in the ISUP (ISDN user part network protocol).

Thereafter, in step S5, the initial address message IAM, contains a user service information parameter indicating the ISDN bearer capability for the speech dialogue. Likewise, the user service information prime parameter in the initial address message IAM indicates the bearer capability for the video dialogue. Furthermore, in step S5 the access transport parameter or user teleservice information parameter of the IAM message indicates the high layer compatibility information for the multi-dialogue call.

Finally, in step S6, the transmission medium requirement indicates the need to have 2×64 KBit/s channels for the multi-dialogue call towards the ISDN fixed network. Thus, the multi-dialogue call establishment procedure performed by the MSC/VLR-IWF for a video telephony call has been completed, whereafter the multi-dialogue communication including video and speech proceeds in step S7.

8.8 Advantages and Industrial Applicability

As explained above, the inventive communication system, the mobile services switching center and the method for establishing a multi-dialogue communication between two subscribers is applicable for applications that require more than one type of information dialogue per call, e.g. when speech and video is to be used concurrently by a mobile station and a remote ISDN terminal or another mobile station. Such a system is particular advantageous, because it provides a more complete way of communication for different types of audiences and enhances the services currently being offered by the mobile network PLMN.

Current digital mobil technology does not allow the concurrent utilisation—in a single call—of more than one Basic Service, i.e. only one type of call at any one time can be supported. The inventive communication system provides the major advantage of allowing the use of more than one simultaneous basic service in a single call using the multi-dialogue concept as explained above. This concept advantageously uses the latest multirate ISDN procedures in the fixed network (i.e. the ISDN network allows the use of different transmission rates over the B-channels and D-channels), in order to provide the multi-dialogue service also in the PLMN.

The communication system and method of the invention may also advantageously use the planned digital mobile technology to increase the bandwidth per call. This technology (called the High Speed Circuit Switched Data) allows information transfer over the air-interface with a higher rate than the normal maximum rate of 9.6 KBit/s, e.g. 19.2, 28.8, 38.4, 48 . . . , 57.6 KBit/s. That is, when the transmission rate of the current 9.6 KBit/s user rate over the air interface is extended, the inventive communication system and method can be used to provide the multi-dialogue communication even more efficiently.

What is claimed is:

1. A communication system for performing a multi-dialogue communication between a first subscriber station and a second subscriber station through a Mobile services Switching Center (MSC) of a public land mobile network, comprising:
   a) at least one first communication channel provided between the first subscriber station and the Mobile Services Switching Center;
   b) at least one second communication channel provided between the second subscriber station and the Mobile Services Switching Center; wherein
   c) the Mobile Services Switching Center comprises a mapping means for performing said multi-dialogue communication by
      setting up a requested number of concurrent single-dialogues on said at least one second communication channel; and
      mapping said requested number of concurrent single-dialogues as a single call on said at least one second communication channel onto said at least one first communication channel.

2. A communication system according to claim 1, wherein both the first and second subscriber stations are first and second mobile stations of the public land mobile network.

3. A communication system according to claim 2, wherein a fixed network is connected to the public land mobile network via a fixed network exchange wherein the multi-dialogue communication between the first and second mobile stations is carried out through said fixed network.

4. A communication system according to claim 1, wherein the first subscriber station is a mobile radio station of the public land mobile network and the second subscriber station is a subscriber station of a fixed network connected to the public land mobile network via a fixed network exchange.

5. A communication system according to claim 4, wherein the second subscriber station is an ISDN station and said fixed network exchange is an ISDN exchange.

6. A communication system according to claim 2, wherein the first mobile station is provided for transmitting a multi-dialogue call establishment request message to the Mobile Services Switching Center for requesting the multi-dialogue communication to the second mobile station.

7. A communication system according to claim 4, wherein the first mobile station is provided for transmitting a multi-dialogue call establishment request message to the Mobile Services Switching Center for requesting a multi-dialogue communication to the second subscriber station of said fixed network.

8. A communication system according to claim 4, wherein the second subscriber station of said fixed network is provided for transmitting a multi-dialogue call establishment request message to the Mobile Services Switching Center for requesting a multi-dialogue communication to the first mobile station.

9. A communication system according to claim 1, wherein said second communication channel is a communication channel of 64 kBit/s and said first communication channel is a communication channel of less than 64 kBit/s, e.g. 9.6 kBit/s or 14.4 KBit/s.

10. A communication system according to claim 5, wherein said second communication channel is a ISDN B-channel or an ISDN D-channel.

11. A communication system according to claim 1, wherein the multi-dialogue communication comprise at least one selected from the group consisting of: a speech/video, a data transfer/video, a facsimile/video, a speech/data transfer multi-dialogue and simultaneous dialogues for data transfer.

12. A communication system according to claim 1, wherein the multi-dialogue communication is a speech dialogue/video dialogue, wherein 5 radio traffic channels are used between the first and second mobile station with 1 radio traffic channel used for said speech dialogue and 4 radio traffic channels used for said video dialogue.

13. A communication system according to claim 6, wherein the multi-dialogue call establishment request message comprises several sets of compatibility information, each set defining a distinct single dialogue of said requested multi-dialogue call, and a multi-dialogue-call indicator indicating a multi-dialogue request.

14. A communication system according to claim 4, wherein said mapping means performs a mapping of mobile compatibility information of said mobile station and ISDN/ISUP bearer capabilities and High Layer compatibility information of said fixed network subscriber station.

15. A communication system according to claim 12, wherein said 1 radio traffic channel used for said speech dialogue is mapped to a first ISDN B-channel and said 4 radio traffic channels used for said video dialogue are mapped to a second ISDN B-channel.

16. A communication system according to claim 1, wherein a multirate ISDN procedure is used to allocate multiple B-channels.

17. A communication system according to claim 1, wherein each single dialogue comprises a single bearer service and/or teleservice and the multi-dialogue comprises a concurrent occurrence of multiple bearer services and/or teleservices.

18. A communication system according to claim 1, wherein the public land mobile network comprises at least one selected from the group consisting of: a D1-, D2 mobile network, a GSM 900 MHz Global System for Mobile communications, a DCS 1800 Digital Cellular System at 1800 MHz, an E-plus mobile network and a PCS 1900.,MHz Personal Communication System.

19. A communication system according to claim 3, wherein said fixed network comprises: an Integrated Services Digital network ISDN or a Packet Switched Public Data Network PSPDN.

20. A communication system according claim 12, wherein said traffic channels are defined in at least one selected from the group consisting of: the A interface between said Mobile services Switching Center and a base station controller, the A-bis interface between said base station controller and a base transceiver station, and the Um air interface between said mobile station and said base transceiver station.

21. Mobile services Switching Center of a public land mobile network connected via at least one first communication channel with a first subscriber station and via at least one second communication channel with a second subscriber station, for performing a multi-dialogue communication between said first subscriber station and said second subscriber station, comprising:

a mapping means (MP) for performing the multi-dialogue communication by setting up a requested number of concurrent single-dialogues on said at least one second communication channel and mapping said requested number of concurrent single-dialogues as a single call on said at least one second communication channel onto said at least one first communication channel.

22. A method for establishing a multi-dialogue communication between a first subscriber station and a second subscriber station through a Mobile Services Switching Center of a public land mobile network, comprising:

a) sending a multi-dialogue call set-up message from the first subscriber station to said Mobile Services Switching Center indicating a number of concurrent single dialogues requested to be set up;

b) receiving said multi-dialogue call set-up message in the Mobile Services Switching Center and identifying the types of said requested concurrent single dialogues; and c) successively assigning said types of requested single dialogues to a corresponding number of second communication channels between the Mobile Services Switching Center and the second subscriber station; and d) mapping said requested number of single-dialogues on said second communication channels onto at least one first communication channel between the first subscriber station and the Mobile Services Switching Center.

23. A method according to claim 22, wherein both said first and second subscriber stations are mobile stations of said public land mobile network (PLMN).

24. A method according to claim 23 further comprising the step of transmitting from the first mobile station a multi-dialogue call establishment request message to the Mobile Services Switching Center for requesting the multi-dialogue communication to the second mobile station.

25. A method according to claim 22, wherein said first subscriber station is a first mobile station of said public land mobile network; and further comprising the step of transmitting from the first mobile station a multi-dialogue call establishment request message to the Mobile Services Switching Center for requesting the multi-dialogue communication to a second subscriber station of a fixed network connected to the public land mobile network via a fixed network exchange.

26. A method according to claim 22, wherein said first subscriber station is a first mobile station of said public land mobile network; and further comprising the step of transmitting from a second subscriber station, of a fixed network connected to the public land mobile network via a fixed network exchange a multi-dialogue call establishment request message to the Mobile Services Switching Center for requesting said multi-dialogue communication to said first mobile station.

27. A method according to claim 22, wherein said second communication channel is a communication channel of 64 kBit/s and said first communication channel is a communication channel of less than 64 kBit/s, e.g. of 9.6 KBit/s or 14.4 KBit/s.

28. A method according to claim 22, wherein said second communication channel is an ISDN B- or ISDN D-channel.

29. A method according to claim 22, wherein the multi-dialogue communication comprises at least one selected from the group consisting of: a speech/video, a data transfer/video, a facsimile/video, a speech/data transfer multi-dialogue and simultaneous dialogues for data transfer.

30. A method according to claims 24, wherein the multi-dialogue call establishment request message comprises several sets of compatibility information, each defining a distinct single dialogue of said requested multi-dialogue call, and a multi-dialogue-call indicator indicating a multi-dialogue request.

31. A method according to claim 23, wherein each single dialogue comprises at least one selected from the group consisting of a single bearer service, and teleservice and said multi-dialogue is established as a concurrent occurrence of multiple bearer services and/or teleservices on said mapped communication channels.

32. A communication system according to claim 7, wherein the multi-dialogue call establishment request message comprises several sets of compatibility information, each set defining a distinct single dialogue of said requested multi-dialogue call, and a multi-dialogue-call indicator indicating a multi-dialogue request.

33. A communication system according to claim 8, wherein the multi-dialogue call establishment request message comprises several sets of compatibility information, each set defining a distinct single dialogue of said requested multi-dialogue call, and a multi-dialogue-call indicator indicating a multi-dialogue request.

34. A method according to claims 25, wherein the multi-dialogue call establishment request message comprises several sets of compatibility information, each defining a distinct single dialogue of said requested multi-dialogue call, and a multi-dialogue-call indicator indicating a multi-dialogue request.

35. A method according to claims 26, wherein the multi-dialogue call establishment request message comprises several sets of compatibility information, each defining a distinct single dialogue of said requested multi-dialogue call, and a multi-dialogue-call indicator indicating a multi-dialogue request.

36. A communication system for performing a multi-dialogue communication between a first subscriber station and a second subscriber station through a Mobile services Switching Center of a public land mobile network, comprising:

a) at least one first communication channel provided between the first subscriber station and the Mobile Services Switching Center;

b) at least one second communication channel provided between the second subscriber station and the Mobile Services Switching Center; wherein c) the Mobile Services Switching Center comprises a mapping means for performing said multi-dialogue communication by
setting up a requested number of concurrent single-dialogues on said at least one second communication channel; and
mapping said requested number of concurrent single-dialogues as a single call on said at least one second communication channel onto said at least one first communication channel;
wherein
the first subscriber station is a mobile radio station of the public land mobile network and the second subscriber station is a subscriber station of a fixed network connected to the public land mobile network via a fixed network exchange; and said mapping means performs a mapping of mobile compatibility information of said mobile station and ISDN/ISUP bearer capabilities and High Layer compatibility information of said fixed network subscriber station.

37. A communication system for performing a multi-dialogue communication between a first subscriber station and a second subscriber station through a Mobile services Switching Center of a public land mobile network, comprising:

a) at least one first communication channel provided between the first subscriber station and the Mobile Services Switching Center;

b) at least one second communication channel provided between the second subscriber station and the Mobile Services Switching Center; wherein c) the Mobile Services Switching Center comprises a mapping means for performing said multi-dialogue communication by setting up a requested number of concurrent single-dialogues on said at least one second communication channel; and mapping said requested number of single-dialogues as a single call on said at least one second communication channel onto said at least one first communication channel; wherein the first subscriber station is a mobile radio station (MS 1) of the public land mobile network and the second subscriber station is a subscriber station of a fixed network connected to the public land mobile network via a fixed network exchange;

the first mobile station is provided for transmitting a multi-dialogue call establishment request message to the Mobile Services Switching Center for requesting a multi-dialogue communication to the second subscriber station of said fixed network; and the second subscriber station of said fixed network is provided for transmitting a multi-dialogue call establishment request message to the Mobile Services Switching Center for requesting a multi-dialogue communication to the first mobile station.

38. A communication system for performing a multi-dialogue communication between a first subscriber station and a second subscriber station through a Mobile services Switching Center of a public land mobile network, comprising:

a) at least one first communication channel provided between the first subscriber station and the Mobile Services Switching Center;

b) at least one second communication channel provided between the second subscriber station and the Mobile Services Switching Center; wherein c) the Mobile Services Switching Center comprises a mapping means for performing said multi-dialogue communication by setting up a requested number of concurrent single-dialogues on at least one second communication channel; and mapping said requested number of concurrent single-dialogues as a single call on said at least one second communication channel onto said at least one first communication channel; wherein the first subscriber station is a mobile radio station of the public land mobile network and the second subscriber station is a subscriber station of a fixed network connected to the public land mobile network via a fixed network exchange;

the first mobile station is provided for transmitting a multi-dialogue call establishment request message to the Mobile Services Switching Center for requesting a multi-dialogue communication to the second subscriber station of said fixed network;

the second subscriber station of said fixed network is provided for transmitting a multi-dialogue call establishment request message to the Mobile Services Switching Center for requesting a multi-dialogue communication to the first mobile station; and said multi-dialogue call establishment request message comprises several sets of compatibility information, each set defining a distinct single dialogue of said requested multi-dialogue call, and a multi-dialogue-call indicator indicating a multi-dialogue request.

39. A communication system for performing a multi-dialogue communication between a first subscriber station and a second subscriber station through a Mobile services Switching Center of a public land mobile network, comprising:

a) at least one first communication channel provided between the first subscriber station and the Mobile Services Switching Center;

b) at least one second communication channel provided between the second subscriber station and the Mobile Services Switching Center; wherein c) the Mobile Services Switching Center comprises a mapping means for performing said multi-dialogue communication by setting up a requested number of concurrent single-dialogues on said at least one second communication channel; and mapping said requested number of concurrent single-dialogues as a single call on said at least one second communication channel onto said at least one first communication channel; wherein both the first and second subscriber stations are mobile stations of the public land mobile network;

the first mobile station is provided for transmitting a multi-dialogue call establishment request message to the Mobile Services Switching Center for requesting the multi-dialogue communication to the second mobile station; and said multi-dialogue call establishment request message comprises several sets of compatibility information, each set defining a distinct single dialogue of said requested multi-dialogue call, and a multi-dialogue-call indicator indicating a multi-dialogue request.

40. A method for establishing a multi-dialogue communication between a first subscriber station and a second subscriber station through a Mobile Services Switching Center of a public land mobile network, comprising:

a) sending a multi-dialogue call set-up message from the first subscriber station to said Mobile Services Switching Center indicating a number of concurrent single dialogues requested to be set up;

b) receiving said multi-dialogue call set-up message in the Mobile Services Switching Center and identifying the types of said requested concurrent single dialogues; and c) successively assigning said types of requested single dialogues to a corresponding number of second communication channels between the Mobile Services Switching Center and the second subscriber station; and d) mapping said requested number of single-dialogues on said second communication channels onto at least one first communication channel between the first subscriber station and the Mobile Services Switching Center; wherein both said first and second subscriber stations are mobile stations of said public land mobile network; and further comprising the step of transmitting from the first mobile station a multi-dialogue call establishment request message to the Mobile Services Switching Center for requesting the multi-dialogue communication to the second mobile station; wherein in the multi-dialogue call establishment request message several sets of compatibility information, each defining a distinct single dialogue of said requested multi-dialogue call, and a multi-dialogue-call indicator indicating a multi-dialogue request are sent.

41. A method for establishing a multi-dialogue communication between a first subscriber station and a second subscriber station through a Mobile Services Switching Center of a public land mobile network, comprising:

a) sending a multi-dialogue call set-up message from the first subscriber station to said Mobile Services Switching Center indicating a number of concurrent single dialogues requested to be set up;

b) receiving said multi-dialogue call set-up message in the Mobile Services Switching Center and identifying the types of said requested concurrent single dialogues; and c) successively assigning said types of requested single dialogues to a corresponding number of second communication channels between the Mobile Services Switching Center and the second subscriber station; and d) mapping said requested number of single-dialogues on said second communication channels onto at least one first communication channel between the first subscriber station and the Mobile Services Switching Center; wherein said first subscriber station is a first mobile station of said public land mobile network; and further comprising the step of transmitting from the first mobile station a multi-dialogue call establishment request message to the Mobile Services Switching Center for requesting the multi-dialogue communication to a second subscriber station of a fixed network connected to the public land mobile network via a fixed network exchange; wherein in the multi-dialogue call establishment request message several sets of compatibility information, each defining a distinct single dialogue of said requested multi-dialogue call, and a multi-dialogue-call indicator indicating a multi-dialogue request are sent.

42. A method for establishing a multi-dialogue communication between a first subscriber station and a second subscriber station through a Mobile Services Switching Center of a public land mobile network, comprising:

a) sending a multi-dialogue call set-up message from the first subscriber station to said Mobile Services Switching Center indicating a number of concurrent single dialogues requested to be set up;

b) receiving said multi-dialogue call set-up message in the Mobile Services Switching Center and identifying the types of said requested concurrent single dialogues; and c) successively assigning said types of requested single dialogues to a corresponding number of second communication channels between the Mobile Services Switching Center and the second subscriber station; and d) mapping said requested number of single-dialogues on said second communication channels onto at least one first communication channel between the first subscriber station and the Mobile Services Switching Center; wherein said first subscriber station is a first mobile station of said public land mobile network; and further comprising the step of transmitting from a second subscriber station, of a fixed network connected to the public land mobile network via a fixed network exchange a multi-dialogue call establishment request message to the Mobile Services Switching Center for requesting said multi-dialogue communication to said first mobile station in the multi-dialogue call establishment request message several sets of compatibility information, each defining a distinct single dialogue of said requested multi-dialogue call, and a multi-dialogue-call indicator indicating a multi-dialogue request are sent.

* * * * *